US012764240B2

(12) United States Patent
Fukushi

(10) Patent No.: US 12,764,240 B2
(45) Date of Patent: Oct. 13, 2026

(54) IMAGE FORMING APPARATUS INCLUDING TOUCH PANEL-TYPE OPERATION PORTION

(71) Applicant: CANON KABUSHIKI KAISHA, Tokyo (JP)

(72) Inventor: Kenji Fukushi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 259 days.

(21) Appl. No.: 18/633,617

(22) Filed: Apr. 12, 2024

(65) Prior Publication Data

US 2024/0388664 A1 Nov. 21, 2024

(30) Foreign Application Priority Data

May 18, 2023 (JP) ................................ 2023-082113

(51) Int. Cl.
*H04N 1/00* (2006.01)

(52) U.S. Cl.
CPC ..... *H04N 1/00411* (2013.01); *H04N 1/00413* (2013.01); *H04N 2201/0094* (2013.01)

(58) Field of Classification Search
None
See application file for complete search history.

(56) References Cited

U.S. PATENT DOCUMENTS

2017/0277398 A1* 9/2017 Ishibashi ............. G06F 3/04817
2024/0069663 A1* 2/2024 Sakaguchi ............ G06F 3/0416

FOREIGN PATENT DOCUMENTS

JP 5509391 B1 6/2014

* cited by examiner

*Primary Examiner* — Andrew H Lam
(74) *Attorney, Agent, or Firm* — ROSSI, KIMMS & McDOWELL LLP

(57) ABSTRACT

An image forming apparatus includes an image forming portion and an operation portion that inputs information on image formation by a first mode in which the operation portion detects a position of an instruction portion being in contact with a surface of a display portion or a second mode in which the operation portion detects a position of the instruction portion at a position away from the surface by a predetermined distance. The operation portion displays as an operation screen a first image including icons on the display portion in the first mode, and displays as the operation screen a second image different in layout of icons from the first image on the display portion in the second mode. The icons included in the second image are larger in size than the icons included in the first image.

11 Claims, 16 Drawing Sheets

FIG 5A
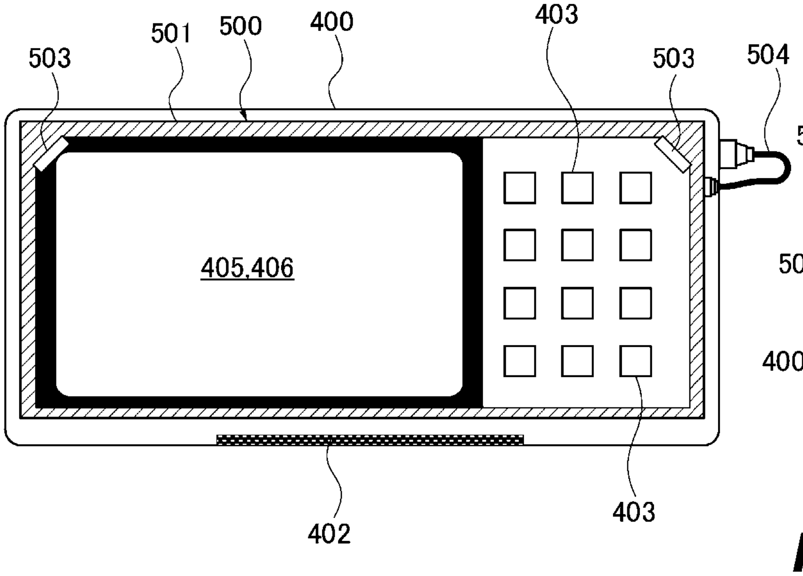
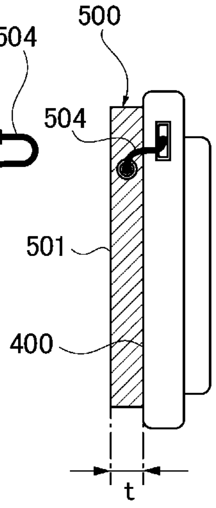
FIG 5B
FIG 5C
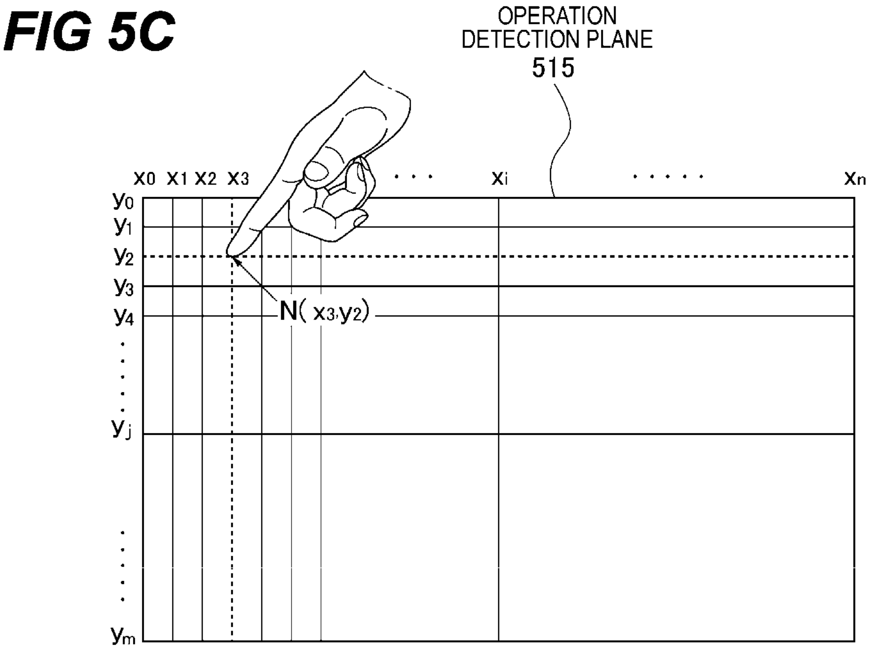

IMAGE FORMING APPARATUS INCLUDING TOUCH PANEL-TYPE OPERATION PORTION

BACKGROUND OF THE INVENTION

Field of the Invention

The present invention relates to an image forming apparatus including a touch panel-type operation portion.

Description of the Related Art

A method including: displaying an image on a display; causing, when a user presses a specific location on the image with his/her finger, a pressure-sensitive sensor or the like to detect coordinates of the pressed location; and performing an operation based on this input signal has conventionally been known. Specifically, a contact operation has widely been used for machines such as a ticket-vending machine and an ATM. The contact operation involves operating such a machine through a touch of a touch panel, a button, or the like by a user.

With regard to these machines, in recent years, there is an increasing demand for operation without a touch of a touch panel, a button, or the like so as to avoid a contact operation. An input method based on a contactless operation has been considered for office machines, such as multifunction peripherals, equipped with a touch panel using a contact operation.

Japanese Patent No. 5,509,391 B1 discloses a technique for contactlessly detecting an indicated position on a reproduced image. Specifically, Japanese Patent No. 5,509,391 B1 discloses a technique involving: displaying, as a reproduced image, an image on a display in the air; forming an infrared light emitting surface at a position of the reproduced image; and contactlessly detecting an operation position on the reproduced image, using reflected light of infrared light.

A touch panel-type operation portion desirably has a screen configuration that allows a user to discriminate setting items concerning image formation at a glance such that the user can make intended settings while reducing the number of touches on the screen as much as possible. That is, a screen configuration that enables confirmation of setting items on a single screen is desirable.

However, the use of a touchless-type operation portion having the same screen configuration as that of the touch panel-type operation portion may cause an erroneous determination that an unintended position is pressed as an operation position touched in a contactless manner, depending on a shaking of an operator's finger or an angle at which an operator looks at the operation portion. That is, the number of erroneous touchless operations may increase.

SUMMARY OF THE INVENTION

The present invention provides a representative configuration including: an image forming portion configured to form an image on a recording medium; and an operation portion including a display portion that displays as an operation screen an image including icons each indicating information on image formation, the operation portion being configured to input the information on image formation by a first mode in which the operation portion detects a position of an instruction portion being in contact with a surface of the display portion or a second mode in which the operation portion detects a position of the instruction portion at a position away from the surface by a predetermined distance in a direction perpendicular to the surface, wherein the operation portion that is in the first mode displays as the operation screen a first image including the icons on the display portion, the operation portion that is in the second mode displays as the operation screen a second image different from the first image on the display portion, and the second image displayed as the operation screen on the display portion when the operation portion is in the second mode includes icons that are larger in size than the icons included in the first image.

According to the present invention, it is possible to reduce a possibility of erroneous operation on the operation portion in each mode.

Further features of the present invention will become apparent from the following description of exemplary embodiments with reference to the attached drawings.

BRIEF DESCRIPTION OF THE DRAWINGS

FIGS. 5A and 5B are schematic diagrams each illustrating the contactless operation unit attached to the operation portion.

FIG. 5C is a diagram illustrating an operation detection plane of the contactless operation unit, on which x-y coordinate axes are superimposed.

DESCRIPTION OF THE EMBODIMENTS

First Embodiment

<General Configuration of Image Forming Apparatus>

An overall configuration of an image forming apparatus according to a first embodiment will be described below with reference to the drawings. It should be noted that dimensions, materials, shapes, relative arrangements, and the like concerning constituents to be described below are not intended to limit the scope of the present invention unless otherwise specified. In the following, an electrophotographic system will be exemplified as a system for forming an image on a recording medium; however, the present invention is not limited thereto. The present invention may employ other systems such as an inkjet system.

Figure 1:
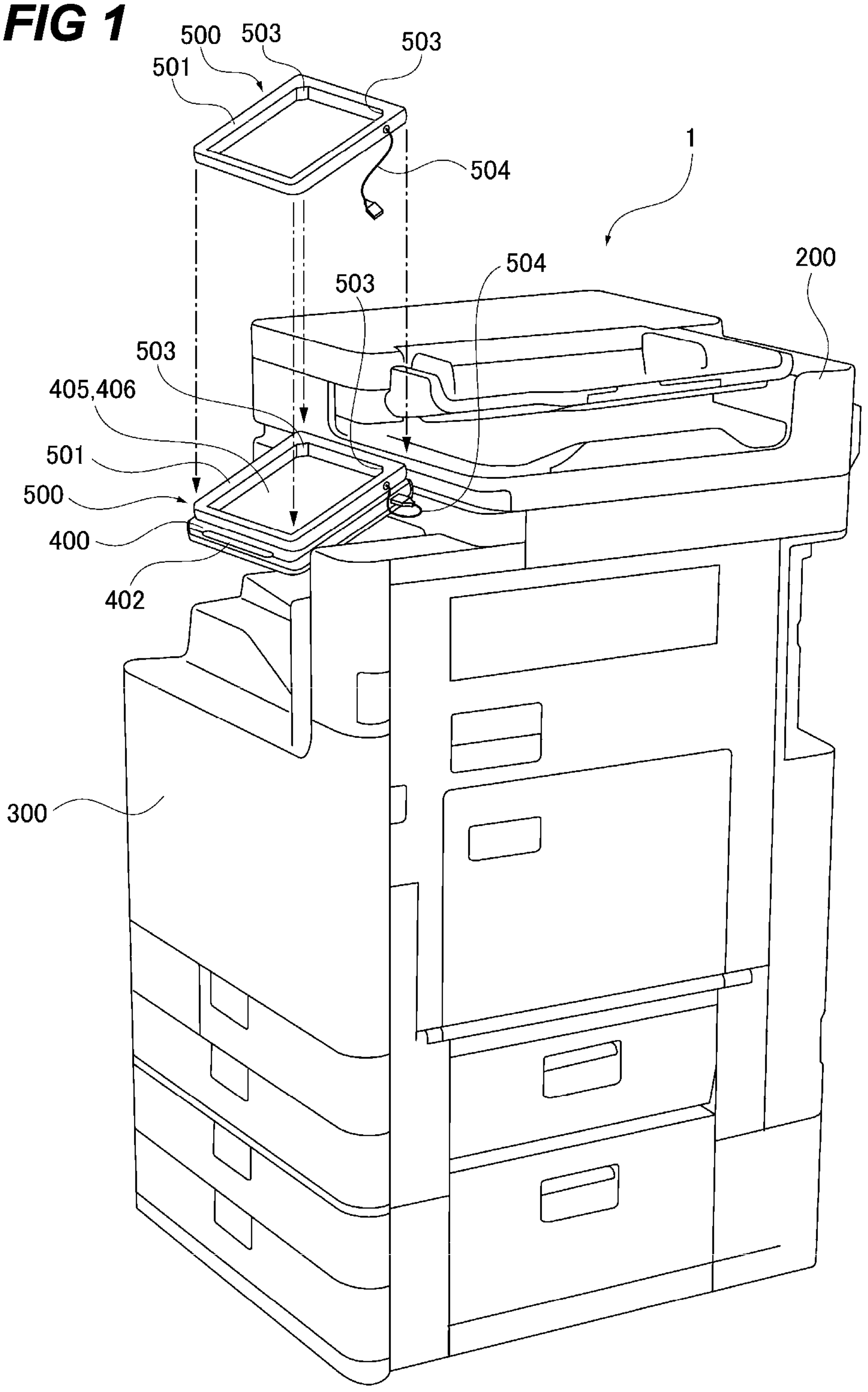
FIG. 1 is a schematic perspective view illustrating an image forming apparatus according to a first embodiment.

FIG. 1 is a schematic perspective view illustrating an image forming apparatus 1 according to a first embodiment. As illustrated in FIG. 1, the image forming apparatus 1 includes: a printer portion 300 as an image forming portion that forms an image on a recording medium; and a scanner portion 200 as an image read portion that optically reads an image of an original mounted on a glass plate (not illustrated) and transforms the image into image data. The image forming apparatus 1 also includes an operation portion 400 and a contactless operation unit 500.

The operation portion 400 includes a liquid crystal display (LCD) 406 as a display portion that displays a screen for setting conditions of image formation on the recording medium by the printer portion 300, and a state of the image forming apparatus 1. The LCD 406 displays, as information on image formation, a screen for making settings concerning image formation, such as the number of recording media on which an image is formed, and a size of the recording media and settings concerning image read, such as a size of an original. The LCD 406 also displays, as information on image formation, states of the image forming apparatus 1, such as a state during which the image forming apparatus 1 performs image formation processing, a state during which the image forming apparatus 1 stops due to an error, and a standby state. The LCD 406 also displays, as information on image formation, a screen for instructing operations such as a “scan” operation, a “copy” operation, and a “fax” operation.

The operation portion 400 also includes a touch panel 405 through which an instruction is input to the image forming apparatus 1. The touch panel 405 is placed on the LCD 406 in a direction perpendicular to a display surface of the LCD 406. Specifically, the touch panel 405 is disposed closer to a user who looks at a screen than the LCD 406 is. It should be noted that the LCD 406 and the touch panel 405 correspond to a display portion. In addition, since the touch panel 405 is disposed closer to the user than the LCD 406 is, a surface, which the user touches, of the touch panel 405 corresponds to a surface of the display portion.

In the present embodiment, a contact mode (a first mode) and a contactless mode (a second mode) are switchable. In the contact mode, information is input using the touch panel 405. In the contactless mode, information is input using the contactless operation unit 500. As will be described in detail later, the two modes can be switched by, for example, operation through hardware keys 403, operation through the touch panel 405, operation through the contactless operation unit 500, or connection of an external operation device to a multifunction peripheral. Input information to be obtained by operation through the hardware keys 403, the touch panel 405, or the contactless operation unit 500 is transmitted to an operation portion CPU 401. It should be noted that the input modes may be switched by the operation portion CPU 401 or a controller 100. That is, the operation portion CPU 401 and the controller 100 correspond to a switch portion.

In the contact mode, when the user touches the touch panel 405 with his/her finger or an instruction portion such as a stylus, a touch panel control portion 404 detects a location on the touch panel 405 where the instruction portion has touched, and generates coordinate data indicating the detected location. That is, the touch panel 405 and the touch panel control portion 404 correspond to a first generation portion that detects a location on the touch panel 405 where the instruction portion has touched, and generates first input information (coordinate data) indicating the detected location. Therefore, the user touches a screen displayed on the display surface of the LCD 406, thereby making settings concerning image formation, such as the number of recording media on which an image is formed, and a size of the recording media and settings concerning image read, such as a size of an original.

Although not illustrated in FIG. 1, the operation portion 400 includes, in addition to the LCD 406 placed on the touch panel 405, the hardware keys 403 disposed outside a region where the LCD 406 is placed. The hardware keys 403 include keys and a numeric keypad for instructing operations of the image forming apparatus, such as settings and job commands concerning image formation.

The operation portion 400 also includes a light emitting diode (LED) 402 that turns on, turns off, or blinks to notify the user apart from the image forming apparatus 1 of an error occurring in the image forming apparatus 1 or a state during which the image forming apparatus 1 performs the image formation processing.

In the contactless mode, a contactless sensor 503 detects, at a position away from the display surface of the LCD 406 by a predetermined distance in the direction perpendicular to the display surface of the LCD 406, a position of the instruction portion that has approached the display surface of the LCD 406 by the predetermined distance. A contactless sensor control portion 502 generates coordinate data indicating the detected position. That is, the contactless sensor 503 and the contactless sensor control portion 502 correspond to a second generation portion that detects a position of the instruction portion that has approached the display surface of the LCD 406 by the predetermined distance and generates second input information (coordinate data) indicating the detected position.

In the contact mode, the second input information is not generated, but the first input information is generated. In the contactless mode, the first input information is not generated, but the second input information is generated. That is, the contact mode corresponds to a first mode, and the contactless mode corresponds to a second mode. In the contact mode (the first mode), the position of the instruction portion that has touched the surface of the LCD 406 is detected. In the contactless mode (the second mode), the position of the instruction portion is detected at the position away from the surface of the LCD 406 by the predetermined distance in the direction perpendicular to the surface of the LCD 406.

According to this configuration, in the contactless mode, the user is able to make settings concerning image formation, such as the number of recording media on which an image is formed, and a size of the recording media and settings concerning image read, such as a size of an original, without touching the LCD 406 (the touch panel 405).

The contactless operation unit 500 includes a housing (a frame) that can be placed on the operation portion 400 so as to surround an outer periphery of the operation portion 400. The contactless operation unit 500 is attachable to the operation portion 400 as illustrated in FIG. 1. The present embodiment exemplifies the configuration in which the contactless operation unit 500 is retrofitted as an optional device to the image forming apparatus 1; however, the present invention is not limited thereto. For example, the contactless operation unit 500 may be integrally provided on the image forming apparatus in advance.

The perspective view of FIG. 1 illustrates the image forming apparatus 1 to which the contactless operation unit 500 has been attached. In the present embodiment, the contactless operation unit 500 includes a frame 501. The frame 501 has a shape (a housing) that surrounds an outer periphery, that is, four sides of the LCD 406 and has a central opening (a region of the touch panel 405) through which the display surface of the LCD 406 can be seen. However, the shape (the structure) of the frame 501 of the contactless operation unit 500 is not limited thereto. The frame 501 of the contactless operation unit 500 may be placed on one or two of the four sides of the LCD 406 as long as a detection range by the contactless sensor 503 to be described later (an operation detection plane 515 illustrated in FIGS. 5 and 6) can cover the entire region of the touch panel 405. The frame 501 of the contactless operation unit 500 can have the shape (the housing) that surrounds the outer periphery, that is, the four sides of the LCD 406 since a region to be subjected to contactless operation is most visually recognizable.

The contactless operation unit 500 includes the contactless sensor 503. The contactless sensor 503 is capable of detecting the instruction portion that has passed through the central opening of the frame 501 of the contactless operation unit 500 and a position of the instruction portion in the central opening of the frame 501.

The contactless operation unit 500 also includes a connection cable 504 as a connection portion that electrically connects the contactless operation unit 500 to the image forming apparatus 1. The image forming apparatus 1 is connectable to the connection cable 504. The contactless operation unit 500 is electrically connected to the image forming apparatus 1 with the connection cable 504 connected to the operation portion 400. The contactless operation unit 500 transmits input information indicating the detected position of the instruction portion, to the operation portion 400 via the connection cable 504.

The present embodiment exemplifies, as illustrated in FIG. 1, the configuration in which the contactless operation unit 500 is electrically connected to the image forming apparatus 1 by connecting the connection cable 504 to the operation portion 400 of the image forming apparatus 1; however, the present invention is not limited thereto.

<System Configuration of Image Forming Apparatus>

Figure 2:
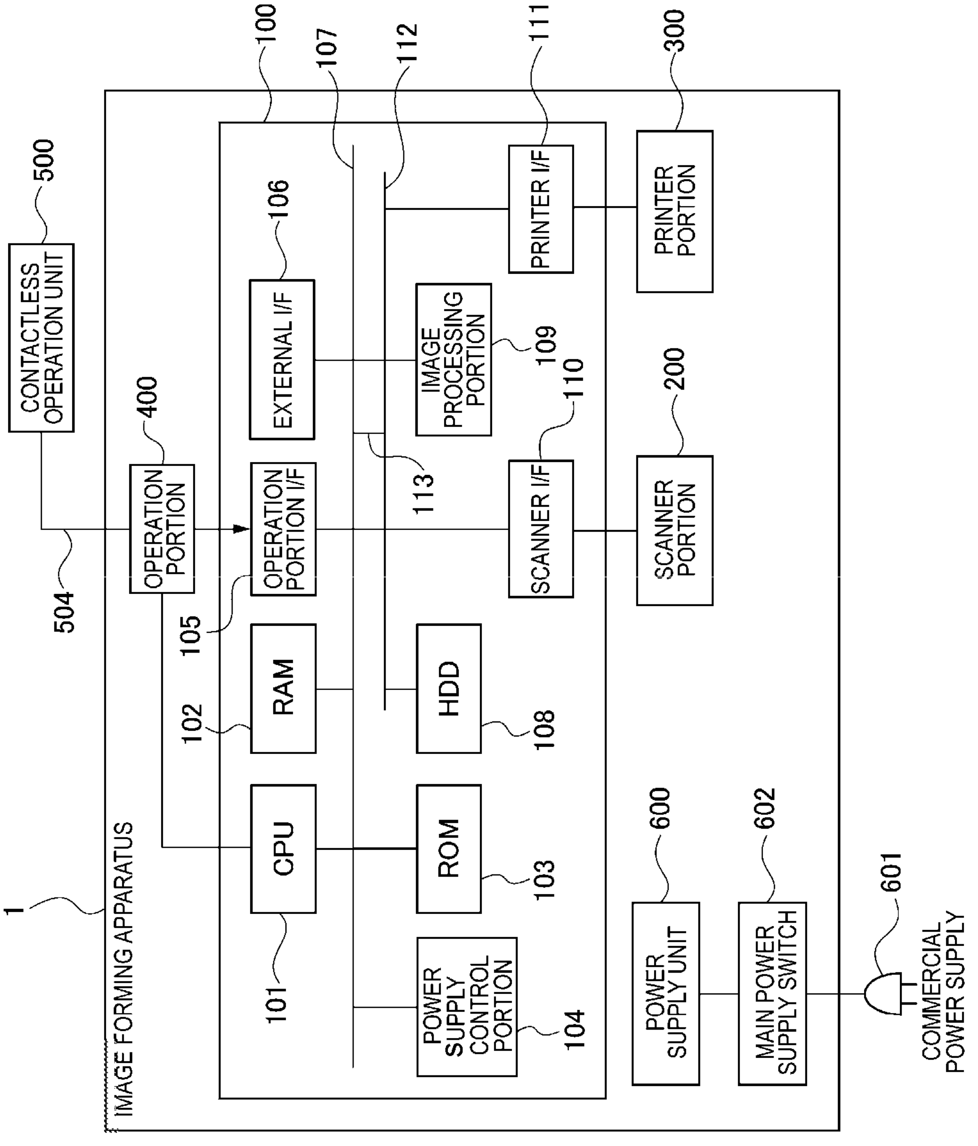
FIG. 2 is a block diagram illustrating a system configuration of the image forming apparatus according to the first embodiment.

As illustrated in FIG. 2, the image forming apparatus 1 includes the controller 100 as a control portion, the scanner portion 200 as the image read portion, the printer portion 300 as the image forming portion, the operation portion 400, the contactless operation unit 500, and a power supply unit 600.

The controller 100 is electrically connected to each of the scanner portion 200, the printer portion 300, and the operation portion 400 so as to be capable of communicating with each of the scanner portion 200, the printer portion 300, and the operation portion 400.

The scanner portion 200 reads an image of an original with an image pickup element (not illustrated) such as a CCD, transforms the image into digital image data (e.g., RGB data), and transfers the digital image data to the controller 100.

The printer portion 300 includes an image forming portion (not illustrated) of an electrophotographic system that forms an image on a recording medium. The printer portion 300 exposes a photosensitive body to light according to the digital image data transferred from the controller 100, to form a latent image, develops the latent image with toner, transfers the developed toner image onto a recording medium, fixes the toner image, and outputs the recording medium on which the toner image has been fixed.

The power supply unit 600 receives electric power from a commercial power supply via a line cord plug 601, converts the electric power into electric power usable for each device, and supplies the electric power to each device. Specifically, when a main power supply switch 602 is switched from an OFF state to an ON state, first, the power supply unit 600 supplies electric power to the controller 100. Thereafter, the power supply unit 600 supplies electric power to, for example, the scanner portion 200, the printer portion 300, the operation portion 400, and the contactless operation unit 500, based on an instruction from the controller 100.

The controller 100 includes a CPU 101, a RAM 102, a ROM 103, a power supply control portion 104, an operation portion interface (I/F) 105, and an external I/F 106 that are connected to each other via a system bus 107. The controller 100 also includes an HDD 108, an image processing portion 109, a scanner I/F 110, and a printer I/F 111 that are connected to each other via an image data bus 112. The system bus 107 and the image data bus 112 are connected to each other via a bus bridge 113, so that the functional blocks connected to each other are capable of communicating with each other.

The CPU 101 of the controller 100 mainly initializes each functional block, communicates with each functional block, and performs various kinds of control, based on various programs stored in the ROM 103 and HDD 108.

The RAM 102 of the controller 100 is used for development of a program for operating the CPU 101, and is used as a work area for information processing and image processing.

The ROM 103 of the controller 100 stores backup data on a boot program for booting up the CPU 101 and control parameters for image control and the like. When the image forming apparatus 1 is powered on, the CPU 101 reads the boot program from the ROM 103, develops the boot program onto the RAM 102, and initializes each functional block according to the program.

The power supply control portion 104 performs ON/OFF control for each device on electric power supplied from the power supply unit 600 to each device.

The operation portion I/F 105 is a first interface portion through which the system bus 107 and the operation portion 400 exchange commands and statuses concerning input information and display information with each other. The controller 100 is capable of transmitting display image data stored in the HDD 108 to the operation portion 400 and displaying the display image data on the LCD 406.

In the present embodiment, the contactless operation unit 500 is electrically connected to the image forming apparatus 1 in such a manner that the contactless operation unit 500 is connected to the operation portion 400 via the connection cable 504. Therefore, the controller 100 allows the system bus 107 and the operation portion 400 to exchange not only the input information from the touch panel 405 but also input information from the contactless operation unit 500, with each other through the operation portion I/F 105.

The external I/F 106 is a second interface portion through which the system bus 107 and a device connectable with a connection portion such as a USB exchange data and the like with each other. The controller 100 allows the system bus 107 and the device connectable with the connection portion to exchange data and the like with each other through the external I/F 106. In addition, the CPU 101 of the controller 100 determines whether the device is connected through the external I/F 106.

The HDD 108 is a storage portion that stores, for example, an OS and a control program operable in the CPU 101, an application program, and image data. The HDD 108 is also usable as a temporary work area in performing image processing. Examples of the image data stored in the HDD 108 include, but not limited to, display image data to be displayed as an operation screen or a setting screen on the operation portion 400, and print image data sent from, for example, an external device or the scanner portion.

The image processing portion 109 uses each of the RAM 102 and the HDD 108 as a work area, and performs various kinds of image processing such as enlargement, reduction, rotation, resolution conversion, and compression, expansion, color conversion, and color adjustment of an image in, for example, a JPEG format.

The scanner I/F 110 is an interface portion through which the scanner portion 200 and the image data bus 112 exchange scanned digital image data with each other and that establishes communications with the scanner portion 200.

The printer I/F 111 is an interface portion through which the printer portion 300 and the image data bus 112 exchange image data to be printed with each other and that establishes communications with the printer portion 300.

Each of the system bus 107 and the image data bus 112 is a transmission path for exchanging, in addition to image data, information required for communications, such as a command and a status, with the operation portion 400. The system bus 107 and the image data bus 112 are connected to each other via the bus bridge 113 so as to be capable of exchanging data with each other.

<System Configurations of Operation Portion and Contactless Operation Unit>

Figure 3:
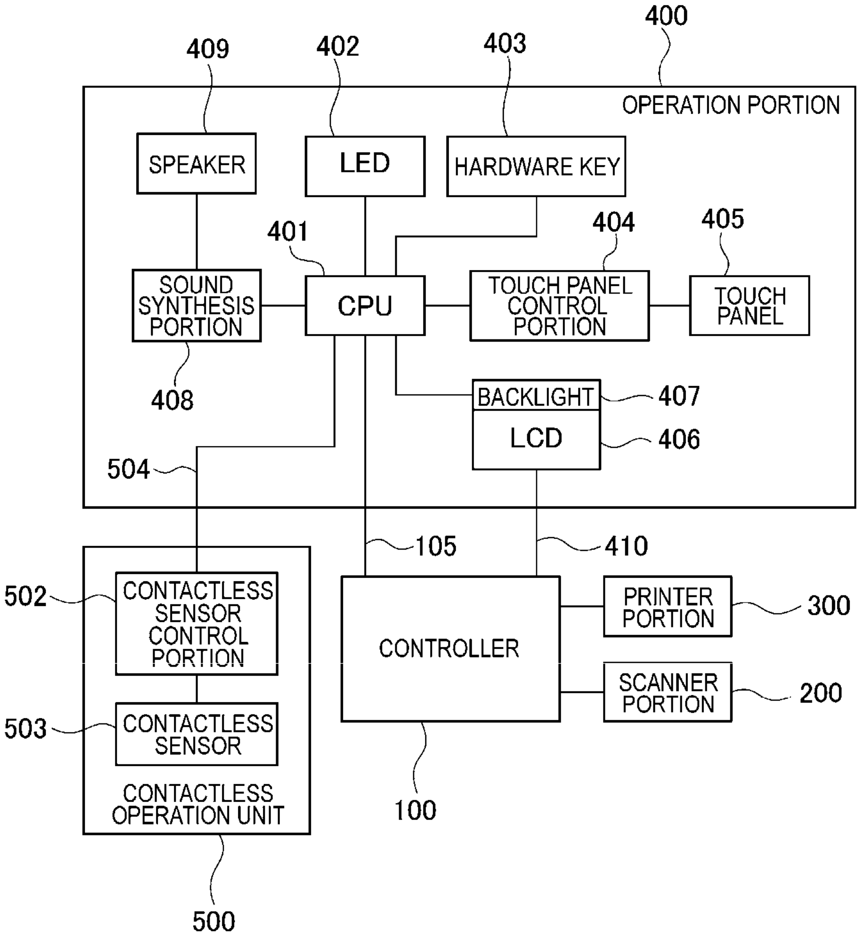
FIG. 3 is a block diagram illustrating a system configuration of an operation portion and a system configuration of a contactless operation unit according to the first embodiment.

FIG. 3 is a block diagram illustrating a system configuration of the operation portion 400 and a system configuration of the contactless operation unit 500 according to the present embodiment. It should be noted that the following various functions are implemented by at least one ASIC.

The controller 100 communicates with the operation portion 400, receives input of settings for the conditions of image read and image formation and input of execution of the image formation, and performs display control and sound output control according to the apparatus state. In order to describe these operations in detail, the operation portion 400 and the contactless operation unit 500 will be described below.

The operation portion 400 includes the operation portion CPU 401, the LED 402, the hardware keys 403, the touch panel control portion 404, the touch panel 405, the LCD 406, a backlight 407, a sound synthesis portion 408, and a speaker 409.

The operation portion CPU 401 operates by a program stored in a ROM of the operation portion CPU 401, and communicates with the controller 100.

Specifically, the operation portion CPU 401 detects whether a certain one of the hardware key 403 has been pressed, and notifies the controller 100 of a detection result. In addition, the touch panel control portion 404 detects whether the touch panel 405 has been touched with the instruction portion, calculates coordinate data indicating a touched location, and transmits the result to the operation portion CPU 401. It should be noted that the first input information corresponds to the coordinate data indicating the touched location on the touch panel 405.

The controller 100 receives these various inputs from the operation portion 400, and generates, if necessary, commands for performing turning-on/blinking/turning-off control on the LED 402, brightness adjustment control on the backlight 407 of the LCD 406, and sound output control for outputting sound from the speaker 409. The controller 100 then transmits these commands to the operation portion CPU 401 through the operation portion I/F 105. The operation portion CPU 401 receives the commands, decodes the commands, and performs, according to the results, the turning-on/blinking/turning-off control on the LED 402, the brightness adjustment control on the backlight 407, and the sound output control on the speaker 409 by causing the sound synthesis portion 408 to generate a command. The controller 100 also receives the various inputs from the operation portion 400, reads display screen data from the HDD 108 if necessary, and displays the display screen data on the LCD 406 through a screen display I/F 410.

The contactless operation unit 500 includes the contactless sensor 503 and the contactless sensor control portion 502. As described above with reference to FIG. 1, the contactless operation unit 500 includes the housing (the frame 501) surrounding the touch panel 405, the LCD 406, and the hardware keys 403, and is placed on the operation portion 400. The contactless sensor 503 detects the presence/absence of the instruction portion in a space defined by the housing (a region of a screen displayed on the LCD 406). The space defined by the housing refers to an opening region 413 (see FIG. 7) in the frame 501 illustrated in FIG. 5A. The contactless sensor control portion 502 calculates, based on a result of the detection by the contactless sensor 503, coordinate data indicating a position of the instruction portion within a plane (the operation detection plane 515 to be described later) parallel to the touch panel 405, in the space defined by the housing. In this case, the second input information corresponds to the coordinate data indicating the position of the instruction portion detected by the contactless operation unit 500. The coordinate data is transmitted to the operation portion CPU 401 via the connection cable 504. The contactless operation unit 500 as the second generation portion detects the position of the instruction portion that has approached the LCD 406 by the predetermined distance, at the position away from the LCD 406 by the predetermined distance, generates the second input information (the coordinate data) indicating the detected position, and transmits the second input information to the operation portion CPU 401.

The operation portion CPU 401 is configured to receive coordinate data to be generated when the touch panel 405 is touched and coordinate data to be generated when the contactless sensor 503 detects the instruction portion. In a case where the contact mode (the first mode) is set, the controller 100 does not perform processing based on the coordinate data obtained by the contactless operation unit 500, but performs processing based on the coordinate data obtained by the touch panel 405. In a case where the contactless mode (the second mode) is set, the controller 100 does not perform the processing based on the coordinate data obtained by the touch panel 405, but performs the processing based on the coordinate data obtained by the contactless operation unit 500.

In the first mode, the operation portion CPU 401 may be configured to receive the coordinate data obtained by the touch panel 405 without receiving the coordinate data obtained by the contactless operation unit 500. In the second mode, the operation portion CPU 401 may be configured to receive the coordinate data obtained by the contactless operation unit 500 without receiving the coordinate data obtained by the touch panel 405.

The operation portion CPU 401 adds, to data to be transmitted, an identifier indicating which one of the coordinate data generated by the touch panel control portion 404 and the coordinate data generated by the contactless sensor control portion 502 is the received coordinate data. The controller 100 is capable of identifying one of the coordinate data detected by the touch panel control portion 404 and the coordinate data detected by the contactless sensor control portion 502, as the received coordinate data, based on the identifier. That is, the operation portion CPU 401 corresponds to an identifier addition portion.

<Generation of Coordinate Data>

Figure 4A:
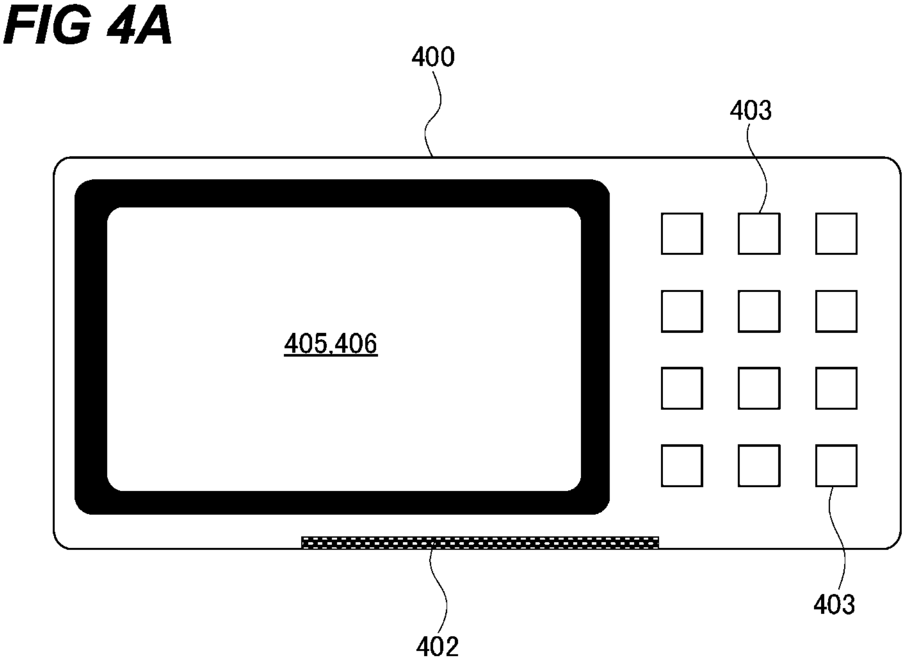
FIG. 4A is a schematic front view illustrating the operation portion.

FIG. 4A is a schematic diagram illustrating the operation portion 400 seen from the front. The touch panel 405 is formed of, for example, a transparent glass plate or a transparent film, and is placed on the LCD 406 to allow the user to see the display screen on the LCD 406 through the touch panel 405. In the operation portion 400, the hardware keys 403 are disposed outside a first region where the touch panel 405 (LCD 406) is placed. The LED 402 is also disposed such that the user can see the LED 402 with ease from the front. The operation portion 400 notifies the operator of the image forming apparatus 1 of, for example, the various input operation screens and apparatus states by the display surface of the LCD 406 and the turning on, turning off, or blinking of the LED 402. The operation portion 400 receives various inputs and setting operation from the operator through the touch panel 405 and the hardware keys 403.

Figure 4B:
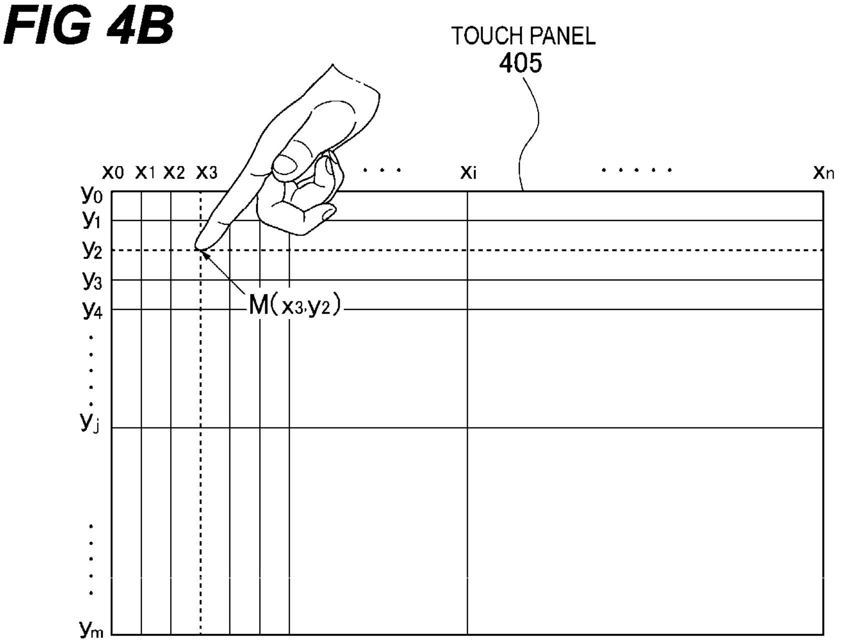
FIG. 4B is a diagram illustrating a touch panel on which x-y coordinate axes are superimposed.

FIG. 4B is a diagram illustrating the touch panel 405 on which x-y coordinate axes are superimposed. The touch panel control portion 404 equally divides the touch panel 405 into "n" along the horizontal axis (the x axis) and into "m" along the vertical axis (the y axis), and virtually allocates x0 to xn coordinates to the divided points on the x axis and y0 to ym coordinates to the divided points on the y axis. A touched location is detectable as a coordinate point on the x-y plane.

In FIG. 4B, a touched location M has a coordinate point (x3, y2). For example, in a case where the touched location M (x3, y2) is included in a region of the touch panel 405 overlapping a screen of a certain key displayed on the LCD 406, it is determined that the key has been pressed, by detecting a touch on the point M. As described above with reference to FIG. 2, the touch panel control portion 404 notifies the operation portion CPU 401 of the coordinate data M (x3, y2) indicating the location touched by the user.

Figure 7:
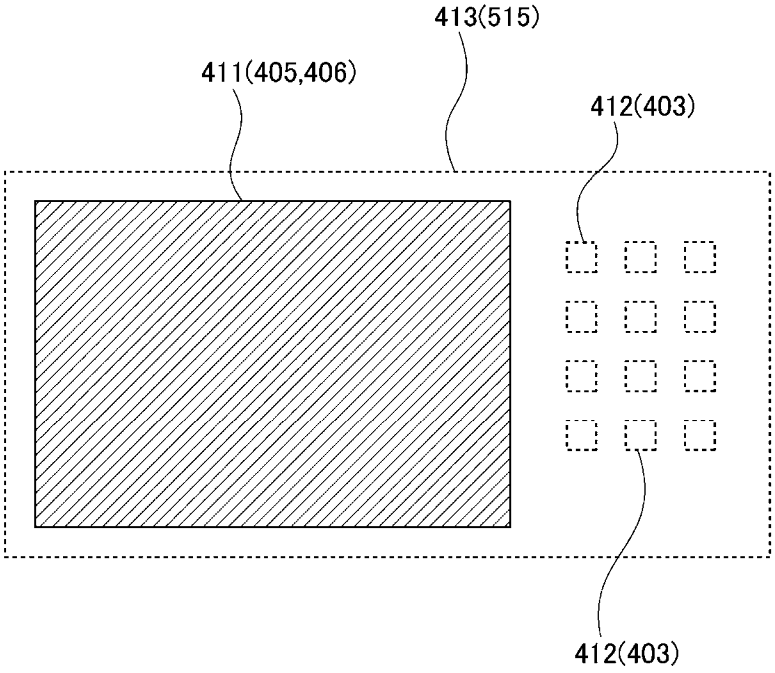
FIG. 7 is a plan view illustrating an opening region in a frame of the contactless operation unit, a first region, and a second region.

FIG. 5A is a schematic diagram illustrating the contactless operation unit 500 attached to the operation portion 400 and seen from the direction perpendicular to the display surface of the LCD 406. FIG. 7 is a plan view illustrating the opening region 413 in the frame 501 of the contactless operation unit 500, a first region 411, and second regions 412. The frame 501 of the contactless operation unit 500 has the shape (the housing) that surrounds the four sides the first region 411 indicating the position of the LCD 406 of the operation portion 400 and the second regions 412 where the hardware keys 403 of the operation portion 400 are disposed, and has a central opening (the first region 411 and the second regions 412). In the present embodiment, two contactless sensors 503 are respectively provided on two ends of an upper side of the contactless operation unit 500. Each contactless sensor 503 is configured with, for example, an infrared sensor that emits and receives infrared light at predetermined timings. When the instruction portion passes through the central opening of the frame 501 of the contactless operation unit 500, the characteristic of received infrared light changes. The contactless sensor control portion 502 detects the presence/absence of the instruction portion, based on this change. That is, the contactless sensor control portion 502 detects that the instruction portion has approached the display surface of the LCD 406 or the hardware keys 403 by the predetermined distance, and also detects the position of the instruction portion. In addition, the two contactless sensors 503 calculate coordinate data indicating that the instruction portion has approached the display surface of the LCD 406 or the hardware keys 403 by the predetermined distance and also indicating the position of the instruction portion. Specifically, the contactless sensors 503 are disposed on a plane parallel to the touch panel 405 and the LCD 406, in the space (the region 413) defined by the frame 501 of the contactless operation unit 500. Upon detection of the instruction portion that has passed through the plane (the operation detection plane 515 to be described later), each of the contactless sensors 503 detects a distance between the instruction portion and the corresponding contactless sensor 503 on the plane, and calculates the position of the instruction portion on the plane by triangulation. Coordinate data indicating the calculated position of the instruction portion is transmitted to the operation portion 400 via the connection cable 504.

FIG. 5B is a schematic diagram illustrating the contactless operation unit 500 attached to the operation portion 400.

The contactless operation unit 500 is attached in order to allow the user to intuitively operate the display screen of the LCD 406 or the hardware keys 403 without touching the touch panel 405 and the hardware keys 403. Accordingly, the frame 501 of the contactless operation unit 500 needs to have a thickness t to an extent that a coordinate position is detectable on the plane (the operation detection plane 515 to be described later) parallel to the touch panel 405, without a touch on the touch panel 405 and the hardware keys 403 with a fingertip (the instruction portion). If the contactless operation unit 500 is too thick, operability becomes poor since the contactless operation unit 500 hinders operation using the instruction portion. If the plane where the coordinate position is detected is too far from the display surface of the LCD 406, intuitiveness is lost, which makes operability feel poor. Therefore, a proper distance from the touch panel 405 is required. In practice, it is assumed that the thickness t of the frame 501 is about 50 mm, and the distance between the plane for coordinate detection and the display surface of the LCD 406 is about 30 mm. That is, the contactless operation unit 500 detects the instruction portion at a position away from the display surface of the LCD 406 by the predetermined distance (e.g., 30 mm) in the direction perpendicular to the display surface of the LCD 406. In other words, the contactless operation unit 500 detects the instruction portion at a position close to the display surface of the LCD 406 by the predetermined distance (e.g., 30 mm) in the direction perpendicular to the display surface of the LCD 406.

The connection cable 504 is desirably located near a cable insertion port of the operation portion 400 in attaching the contactless operation unit 500 to the operation portion 400. As a result, the length of the connection cable 504 can be shortened, and the extra length of the connection cable 504 does not make the user feel troublesome.

FIG. 5C is a diagram illustrating the operation detection plane 515 on which x-y coordinate axes are superimposed.

The contactless sensor control portion 502 equally divides the operation detection plane 515 into "n" along the horizontal axis (the x axis) and into "m" along the vertical axis (the y axis), and virtually allocates x0 to xn coordinates to the divided points on the x axis and y0 to ym coordinates to the divided points on the y axis. A position of the fingertip that has passed through the operation detection plane 515 is detectable as a coordinate point on the x-y plane.

In FIG. 5C, a touched location N has a coordinate point (x3, y2). For example, in a case where the touched location N (x3, y2) is included in a region of the operation detection plane 515 overlapping a screen of a certain key displayed on the LCD 406, it is determined that the key has been pressed, by detecting contactless operation on the point N. As described above with reference to FIG. 2, the contactless sensor control portion 502 notifies the operation portion CPU 401 of coordinate data N (x3, y2) indicating the position where the user has performed the contactless operation.

Figure 6A:
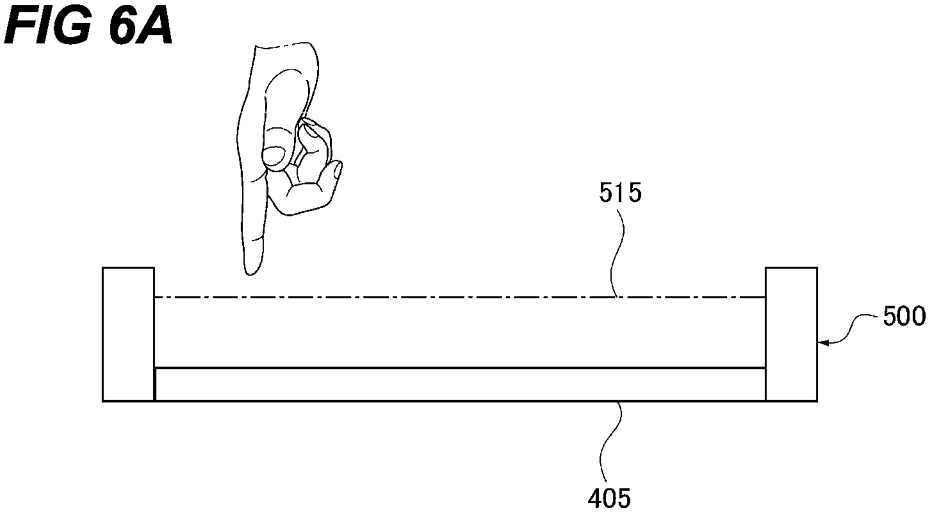
FIGS. 6A, 6B, and 6C are sectional views each illustrating the touch panel and the contactless operation unit.
Figure 6B:
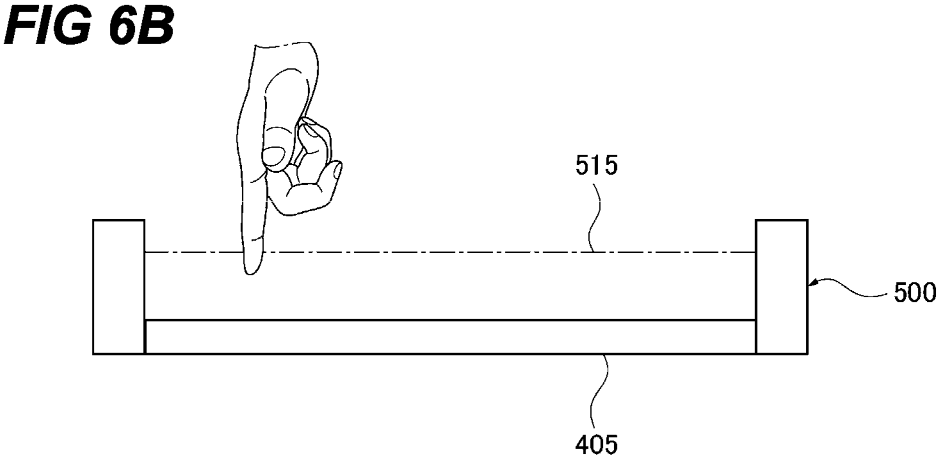
Figure 6C:
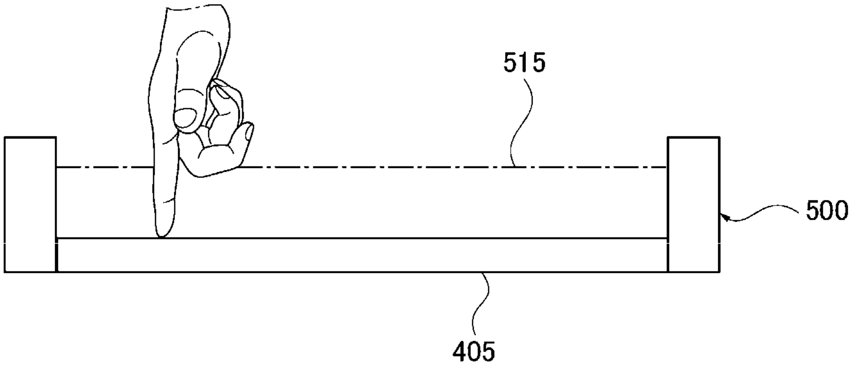

FIGS. 6A, 6B, and 6C are sectional views each illustrating the touch panel 405 and the contactless operation unit 500. However, FIGS. 6A, 6B, 6C do not illustrate the hardware keys 403 of the operation portion 400 and illustrate the touch panel 405 of the operation portion 400. A distance between the operation detection plane 515 and the hardware keys 403 is substantially equal to a distance between the operation detection plane 515 and the touch panel 405. Therefore, contactless operation on the hardware keys 403 can be performed in a manner similar to that of contactless operation on the touch panel 405 to be described below.

As described above with reference to FIGS. 5A to 5C, the contactless operation unit 500 determines that the operation portion 400 has been operated, when the fingertip passes through the operation detection plane 515 as the plane parallel to the touch panel 405 in the space defined by the frame of the contactless operation unit 500. In a state illustrated in FIG. 6A, the fingertip does not reach the operation detection plane 515; therefore, the contactless operation unit 500 determines that the operation portion 400 is not operated. In a state illustrated in FIG. 6B, the fingertip has passed through the operation detection plane 515; therefore, the contactless operation unit 500 determines that the operation portion 400 has been operated.

In a state illustrated in FIG. 6C, the fingertip passes through the operation detection plane 515 and touches the touch panel 405. In this state, coordinate data by the contactless operation and coordinate data indicating the touched location on the touch panel 405 are generated. Also in this case, a unique identifier is added to the generated coordinate data as described above with reference to FIG. 2; therefore, the controller 100 is capable of discriminating the coordinate data by the contactless operation and the coordinate data indicating the touched location on the touch panel 405, from each other.

It should be noted that the coordinate data detected at the operation detection plane 515 of the contactless operation unit 500 is defined within a range that covers all the coordinate data detected on the touch panel 405 and the coordinate data corresponding to each hardware key 403. The first region 411 illustrated in FIG. 7 is a range in which the instruction portion on the touch panel 405 is detected. The second regions 412 illustrated in FIG. 7 are regions located outside the first region 411 and corresponding to the respective hardware keys 403. The region 413 illustrated in FIG. 7 is a range covering the range (the first region 411) in which the instruction portion on the touch panel 405 is detected and the regions (the second regions 412) corresponding to the respective hardware keys 403. The region 413 illustrated in FIG. 7 is the opening region of the frame 501 of the contactless operation unit 500, and is a range in which the contactless sensors of the contactless operation unit 500 detect the instruction portion. The present embodiment describes the case where the operation portion 400 includes the hardware keys 403; however, the operation portion 400 does not necessarily include the hardware keys 403.

<Mode Change Operation>

Figure 8:
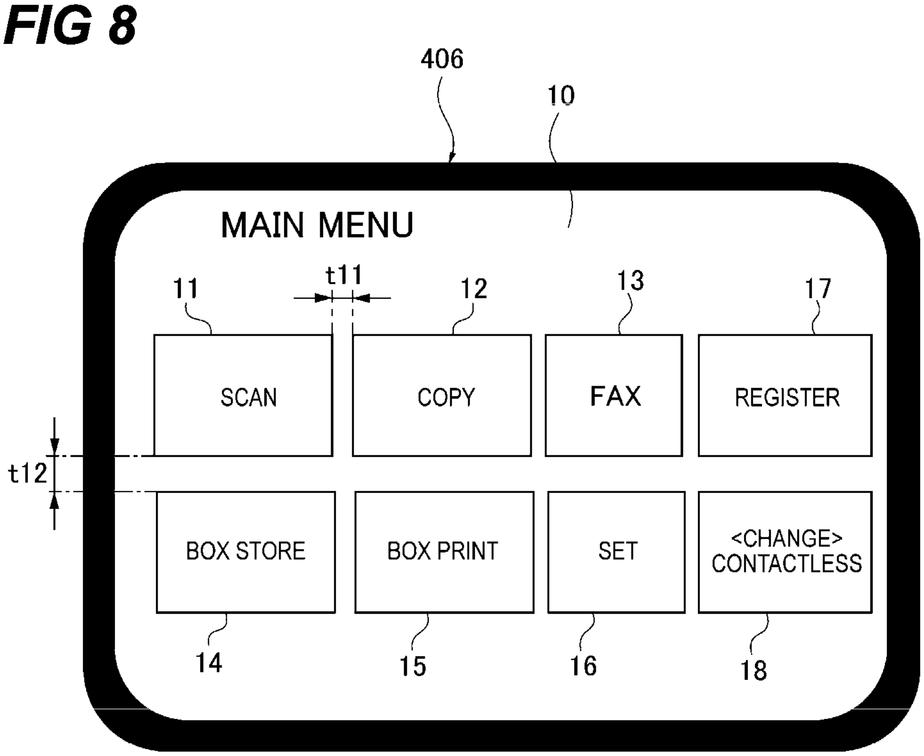
FIG. 8 is a diagram illustrating an example of a main menu screen in a contact mode according to the first embodiment.
Figure 9A:
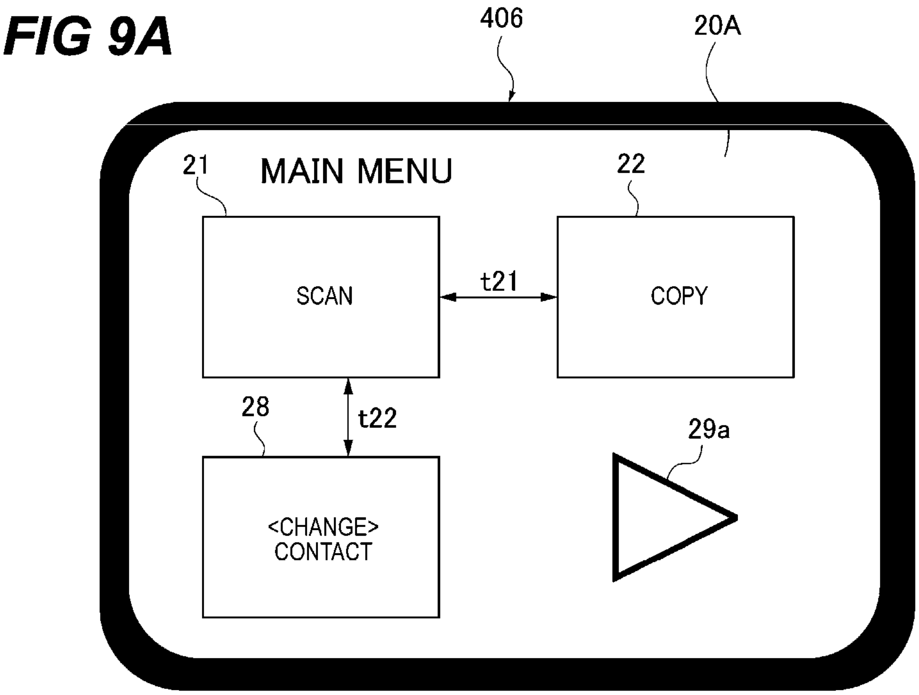
FIGS. 9A and 9B are diagrams each illustrating an example of a main menu screen in a contactless mode according to the first embodiment.
Figure 9B:
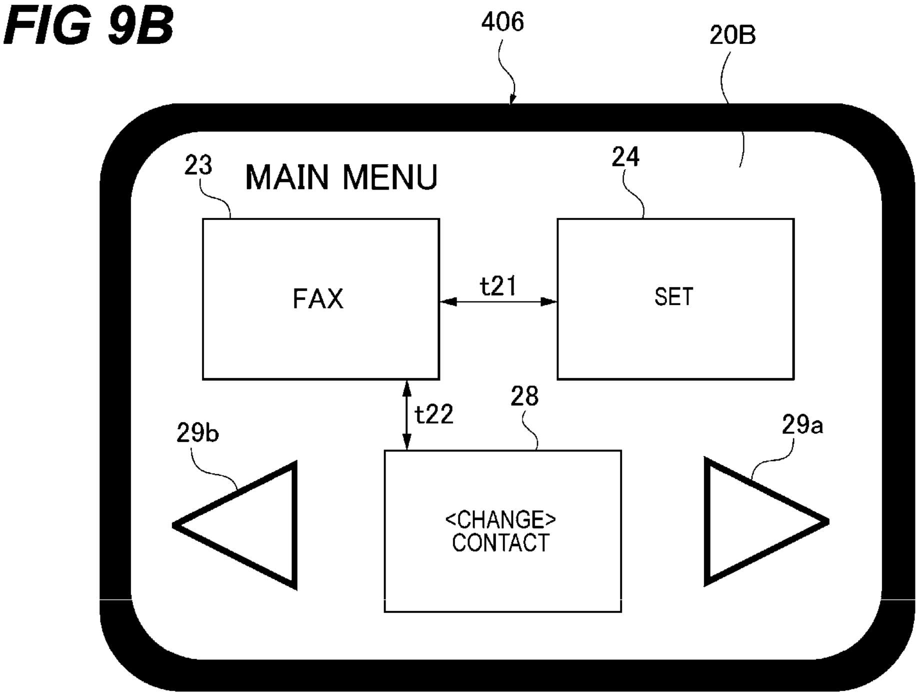
Figure 10:
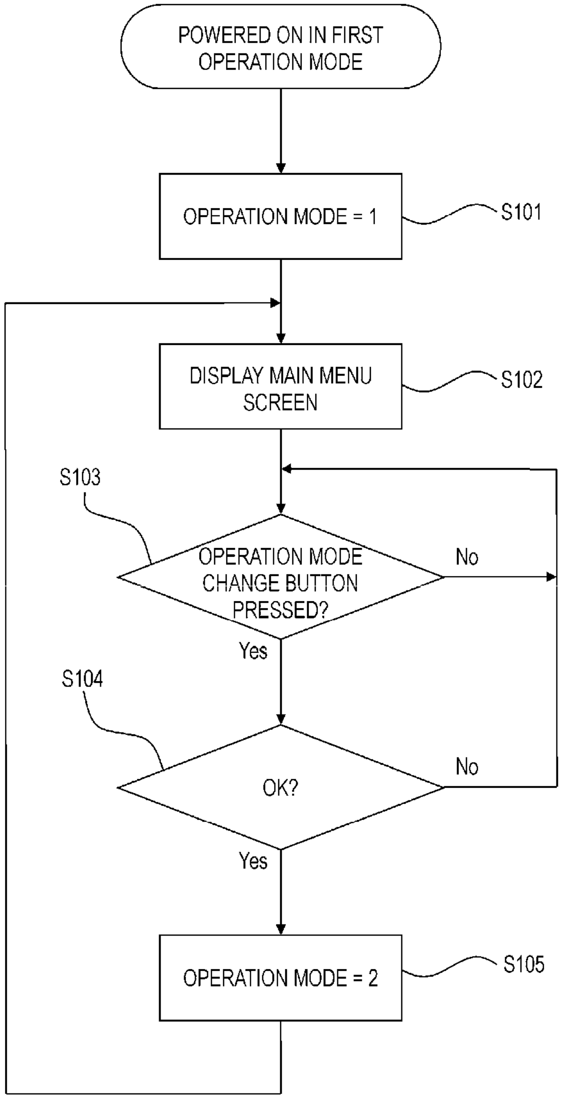
FIG. 10 is a flowchart illustrating an example of mode change control according to the first embodiment.

Next, mode change control will be described using screens illustrated in FIGS. 8, 9A, and 9B and a flowchart illustrated in FIG. 10. FIG. 8 is a diagram illustrating an operation screen (a first image) displayed on the display surface of the LCD 406 in the contact mode. FIGS. 9A and 9B are diagrams each illustrating an operation screen (a second image) displayed on the display surface of the LCD 406 in the contactless mode. FIG. 10 is a flowchart illustrating an example of the mode change control. In the following description, the contact mode as the first mode is also referred to as a first operation mode, and the contactless mode as the second mode is also referred to as a second operation mode.

In the present embodiment, the operation portion 400 is capable of inputting information on image formation by the first operation mode (the contact mode) or the second operation mode (the contactless mode).

The flowchart illustrated in FIG. 10 exemplifies a case where the image forming apparatus 1 is powered on in the first operation mode and then shifts to the second operation mode.

Therefore, the CPU 101 first sets "1" for the operation mode (S101).

Next, the CPU 101 transmits an image signal to the operation portion 400 through the operation portion I/F 105, and displays an operation screen (a main menu screen) in the first operation mode illustrated in FIG. 8, on the display surface of the LCD 406 (S102).

The image signal transmitted from the CPU 101 to the operation portion 400 indicates a first image 10 (FIG. 8) corresponding to display image data to be displayed on the display surface of the LCD 406 and including icons each indicating information on image formation (a setting or an operation instruction).

That is, the CPU 101 displays as the operation screen (the main menu screen) the first image 10 (FIG. 8) including the icons on the display surface of the LCD 406 in the first operation mode.

<Operation Screen in First Operation Mode>

Next, the operation screen in the first operation mode is described with reference to FIG. 8. FIG. 8 is a diagram illustrating an example of the main menu screen as the operation screen to be displayed on the LCD 406 in the first operation mode.

On the main menu screen (the first image 10) illustrated in FIG. 8, buttons 11 to 18 are arranged, which respectively correspond to the icons each indicating the information on image formation. The buttons 11 to 18 include a "scan" button 11, a "copy" button 12, a "fax" button 13, a "box storage" button 14, and a "box print" button 15. The buttons 11 to 18 also include a "setting change" button 16 for changing system settings, and a "user registration" button 17 for user registration. The buttons 11 to 18 also include a "change" button 18 for changing the operation mode. The screen (the first image 10) illustrated in FIG. 8 is the screen in the first operation mode. When the "change" button 18 is pressed, the operation portion 400 changes the first operation mode to the second operation mode as the contactless mode. Therefore, a message "contactless" is displayed on the "change" button 18.

As described above, the first image 10 (FIG. 8) displayed as a single operation screen on the display surface of the LCD 406 in the first operation mode includes the "change" button 18 (a first change icon) indicating a function of changing the operation mode to the second operation mode.

It should be noted that the operation screen (the first image 10) illustrated in FIG. 8 is merely an example of the operation screen in the first operation mode; therefore, the number of buttons, the arrangement of the buttons, and the kinds of the displayed buttons are not limited to those illustrated in FIG. 8.

The mode change control is described again with reference to the flowchart of FIG. 10. The CPU 101 monitors whether the user has pressed the "change" button 18 on the main menu screen (the first image 10) illustrated in FIG. 8 (S103).

When the user presses the "change" button 18, the CPU 101 displays a selection screen showing "OK" or "cancel" for prompting the user to approve the change in operation mode, on the display surface of the LCD 406, in view of a possibility of erroneous operation (S104). When the user does not select "OK" in S104, the CPU 101 does not change the operation mode and continues the display of the main menu screen (the first image 10) illustrated in FIG. 8.

When the user selects "OK" in S104, the CPU 101 sets "2" for the operation mode (S105).

The CPU 101 then transmits an image signal to the operation portion 400 through the operation portion I/F 105, and displays an operation screen (a main menu screen) in the second operation mode illustrated in FIG. 9A or 9B, on the LCD 406 (S102).

The image signal transmitted from the CPU 101 to the operation portion 400 indicates second images 20A (FIG. 9A) and 20B (FIG. 9B) each corresponding to display image data to be displayed on the display surface of the LCD 406 and including icons each indicating information on image formation (a setting or an operation instruction). The second images 20A and 20B illustrated in FIGS. 9A and 9B are different from the first image 10 illustrated in FIG. 8, in a size of each icon or a clearance between two of the icons.

In the present embodiment, the CPU 101 displays as an operation screen one of the second images 20A and 20B (FIGS. 9A and 9B) that are different from the first image 10 in the size of each icon or the clearance between two of the icons, on the display surface of the LCD 406 in the second operation mode.

<Operation Screen in Second Operation Mode>

Next, the operation screens in the second operation mode are described with reference to FIGS. 9A and 9B. FIGS. 9A and 9B are diagrams each illustrating an example of the main menu screen as the operation screen to be displayed on the LCD 406 in the second operation mode.

The main menu screens illustrated in FIGS. 9A and 9B each show buttons (icons each indicating information on image formation) having the same functions as those of the buttons on the main menu screen (the first image 10) in the first operation mode illustrated in FIG. 8. However, the main menu screens illustrated in FIGS. 9A and 9B are different from the main menu screen illustrated in FIG. 8 in the size of each button or the clearance between two of the buttons.

The main menu screen (the second image 20A) illustrated in FIG. 9A is a first one of the main menu screens in the second operation mode. On the main menu screen (the second image 20A) illustrated in FIG. FIG. 9A, buttons 21, 22, 28, and 29*a* are arranged, which respectively correspond to the icons each indicating the information on image formation. The buttons 21, 22, 28, and 29*a* include a "scan" button 21, a "copy" button 22, and a "change" button 28 for changing the operation mode. When the "change" button 28 on the screen illustrated in FIG. 9A is pressed, the operation portion 400 changes the second operation mode to the first operation mode as the contact mode. Therefore, a message "contact" is displayed on the "change" button 28. The buttons 21, 22, 28, and 29*a* also include an arrow button 29*a* for a shift to a subsequent screen. When the arrow button 29*a* is pressed, the subsequent screen, that is, the screen illustrated in FIG. 9B is displayed.

The main menu screen (the second image 20B) illustrated in FIG. 9B is a second one of the main menu screens in the second operation mode. The main menu screen (the second image 20B) illustrated in FIG. 9B shows a "fax" button 23, a "setting" button 24, and a "change" button 28 for changing the operation mode. When the "change" button 28 on the screen illustrated in FIG. 9B is pressed in a manner similar to that for the screen illustrated in FIG. 9A, the operation portion 400 changes the second operation mode to the first operation mode as the contact mode. Therefore, a message "contact" is displayed on the "change" button 28. The main menu screen also shows a left arrow button 29*b* for a return to a previous screen and a right arrow button 29*a* for a shift to a subsequent screen. When the arrow button 29*b* is pressed, the previous screen, that is, the screen illustrated in FIG. 9A is displayed. On the other hand, when the arrow button 29*a* is pressed, the subsequent screen (not illustrated) is displayed; however, the subsequent screen is not described herein.

In the present embodiment, the buttons 21, 22, 23, 24, and 28 included in the second images 20A and 20B each displayed as a single operation screen on the LCD 406 in the second operation mode are larger in size than the buttons 11, 12, 13, 16, and 18 included in the first image 10. In the present embodiment, the buttons 21, 22, 23, 24, and 28 included in the second images 20A and 20B correspond to the same icons each indicating information on image formation as the icons to which the buttons 11, 12, 13, 16, and 18 included in the first image 10 correspond. According to this configuration, it is possible to reduce a possibility of erroneous operation in the second operation mode and to improve the operability of the operation portion 400.

In addition, clearances t21 and t22 each between two of the buttons 21, 22, and 28 (or the buttons 23, 24, and 28) included in the second image 20A (or the second image 20B) displayed as a single operation screen on the LCD 406 in the second operation mode are respectively wider than clearances t11 and t12 each between two of the buttons 11, 12, 13, 16, and 18 included in the first image 10 displayed as a single operation screen on the LCD 406 in the first operation mode. Specifically, the clearance t21 is wider than the clearance t11, and the clearance t22 is wider than the clearance t12. The clearances t11 and t21 extend in a first direction, and the clearances t12 and t22 extend in a second direction orthogonal to the first direction. According to this configuration, it is also possible to reduce a possibility of erroneous operation in the second operation mode and to improve the operability of the operation portion 400. In addition, it is possible to further improve the operability by a combination with increasing the size of each icon.

In addition, the number of buttons included in the second image 20A (or the second image 20B) displayed as a single operation screen on the LCD 406 in the second operation mode is smaller than the number of buttons included in the first image 10 displayed as a single operation screen on the LCD 406 in the first operation mode. Specifically, the number of buttons in the second image 20A is four and the number of buttons in the second image 20B is five, which are smaller than the number (eight) of buttons in the first image 10. According to this configuration, it is also possible to reduce a possibility of erroneous operation in the second operation mode and to improve the operability of the operation portion 400. In addition, it is possible to further improve the operability by a combination with one of or both increasing the size of each icon and widening the clearance between two of the icons.

The CPU 101 divides the plurality of buttons included in the first image 10 displayed as a single operation screen on the LCD 406 in the first operation mode, between the plurality of second images 20A and 20B in the second operation mode. The CPU 101 then displays the plurality second images 20A and 20B thus divided on the LCD 406 one by one so as to switch between the second images 20A and 20B. Specifically, the first image 10 displayed as a single operation screen is divided between the second image 20A and the second image 20B such that the second image 20A includes the buttons 21, 22, and 28 that are respectively equal in function (information on image formation) to the buttons 11, 12, and 18 of the plurality of buttons 11 to 18 included in the first image and the second image 20B includes the buttons 23, 24, and 28 that are respectively equal in function to the buttons 13, 16, and 18 of the plurality of buttons 11 to 18 included in the first image.

The divided second images 20A and 20B each include one of or both the arrow buttons 29*a* and 29*b* (switch icons) each indicating a function of switching between the divided second images 20A and 20B. By selecting the arrow buttons 29*a* and 29*b*, it is possible to display the plurality of second images 20A and 20B on a single operation screen one by one so as to switch between the second images 20A and 20B.

As described above, the second images 20A and 20B displayed as a single operation screen on the LCD 406 in the second operation mode each include the "change" button 28 (a second change icon) indicating a function of changing the second operation mode to the first operation mode.

As described above, in the present embodiment, the CPU 101 displays as an operation screen each of the second images 20A and 20B different from the first image 10 on the LCD 406 in the second operation mode. It is thus possible to reduce a possibility of erroneous operation on the operation portion 400 in each mode and to improve the operability of the operation portion 400.

Second Embodiment

An image forming apparatus according to a second embodiment will be described with reference to FIGS. 11 to 13. The image forming apparatus according to the second embodiment includes a processing unit (not illustrated) that performs processing such as stapling, and a conveyance unit (not illustrated) that turns a sheet upside down and conveys the sheet to a printer portion again; however, the detailed description of these units will not be given herein.

The first embodiment has exemplified the configuration in which the operation portion 400 includes the hardware keys 403 including the numeric keypad and the like, in addition to the LCD 406 on which the touch panel 405 is placed, as illustrated in FIG. 5B. In contrast to this, the present embodiment exemplifies a configuration in which an operation portion 400 does not include hardware keys, but includes an LCD 406 on which a touch panel 405 is placed, as illustrated in FIG. 11. In the present embodiment, an image including buttons such as a numeric keypad is displayed on a display surface of the LCD 406 on which the touch panel 405 is placed.

In the present embodiment, a CPU 101 displays as an operation screen a first image 50 (FIG. 11) on the display surface of the LCD 406 in a contact mode as a first mode. The CPU 101 displays as the operation screen a second image (FIG. 12, 13A, or 13B) different from the first image 50 (FIG. 11) on the display surface of the LCD 406 in a contactless mode as a second mode.

Hereinafter, the first image 50 (FIG. 11) displayed on the LCD 406 in the first mode and the second image (FIG. 12, 13A, or 13B) displayed on the LCD 406 in the second mode will be described in the present embodiment.

<Operation Screen in First Operation Mode>

First, the operation screen in the first operation mode is described with reference to FIG. 11. FIG. 11 is a diagram illustrating an example of the operation screen displayed on the LCD 406 in the first operation mode. FIG. 11 illustrates the operation screen in the first operation mode, in making copy settings as one of functions of the image forming apparatus according to the second embodiment. The screen illustrated in FIG. 11 shows a setting display portion 51 that displays a state of an image forming apparatus main body and details of settings. The screen (the first image 50) illustrated in FIG. 11 also shows, as icons each indicating information on image formation, a "finish" button 52 for selecting a finish state such as stapling, a "duplex copy" button 53 for selecting one-sided copy or duplex copy, a "density" button 54 for selecting print density, and an "other settings" button 55 for selecting other settings such as image position adjustment and stamp processing. The screen illustrated in FIG. 11 also shows numeric keypad buttons 56 for inputting numerical values such as the number of sheets and the number of sets. The screen illustrated in FIG. 11 also shows a "reset" button 57 for resetting settings, a "start" button 58 for starting a "copy" operation, and a "stop" button 59 for stopping a "copy" operation halfway.

The setting display portion 51 displays a state of the image forming apparatus main body, and also displays information input through the foregoing buttons 52 to 56.

Figure 11:
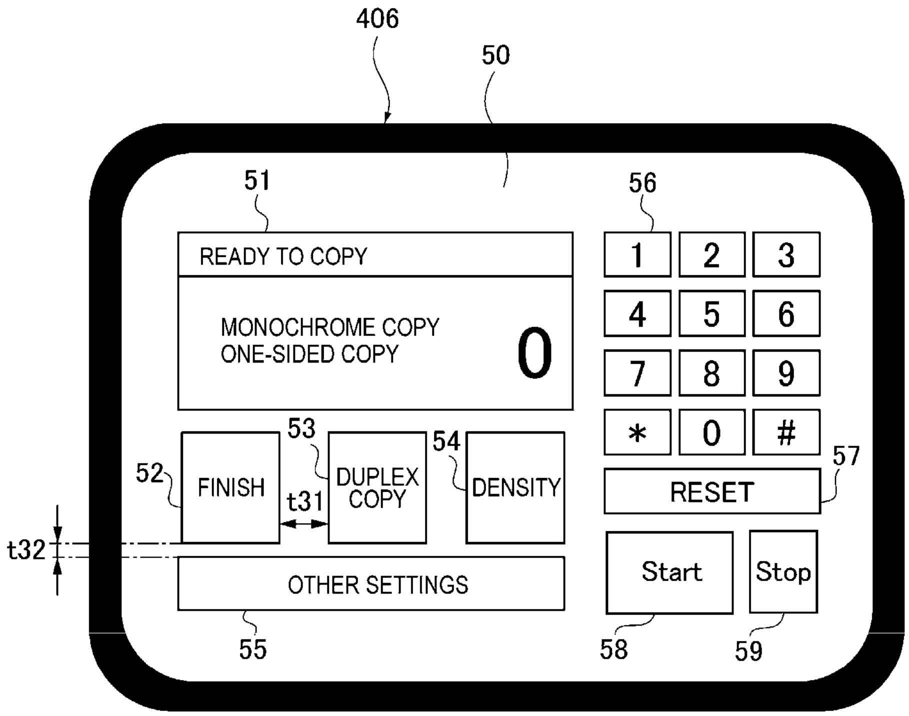
FIG. 11 is a diagram illustrating an example of a copy setting screen in a first operation mode according to a second embodiment.

In the first operation mode, all kinds of information are arranged in a visible manner on a single operation screen as illustrated in FIG. 11.

<Operation Screen in Second Operation Mode>

Next, the operation screens in the second operation mode are described with reference to FIGS. 12, 13A, and 13B. FIGS. 12, 13A, and 13B are diagrams each illustrating an example of the operation screen displayed on the LCD 406 in the second operation mode.

In the present embodiment, the CPU 101 divides the first image 50 displayed as a single operation screen on the LCD 406 in the first mode, among a plurality of second images 60, 60A, and 60B (to be described later) in the second mode.

Figure 12:
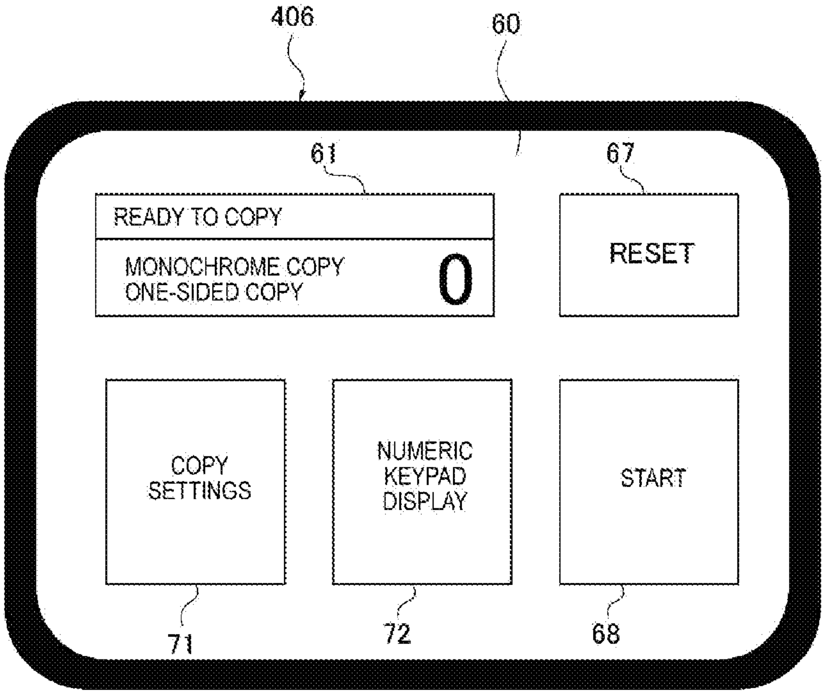
FIG. 12 is a diagram illustrating an example of a copy setting screen in a second operation mode according to the second embodiment.
Figure 13A:
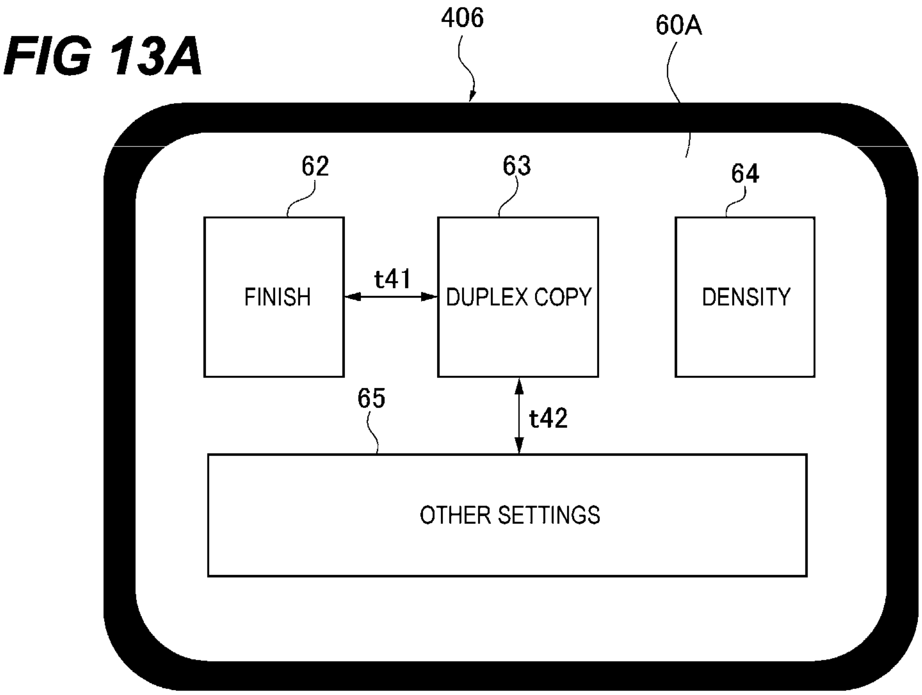
FIGS. 13A and 13B are diagrams each illustrating an example of the copy setting screen in the second operation mode according to the second embodiment.
Figure 13B:
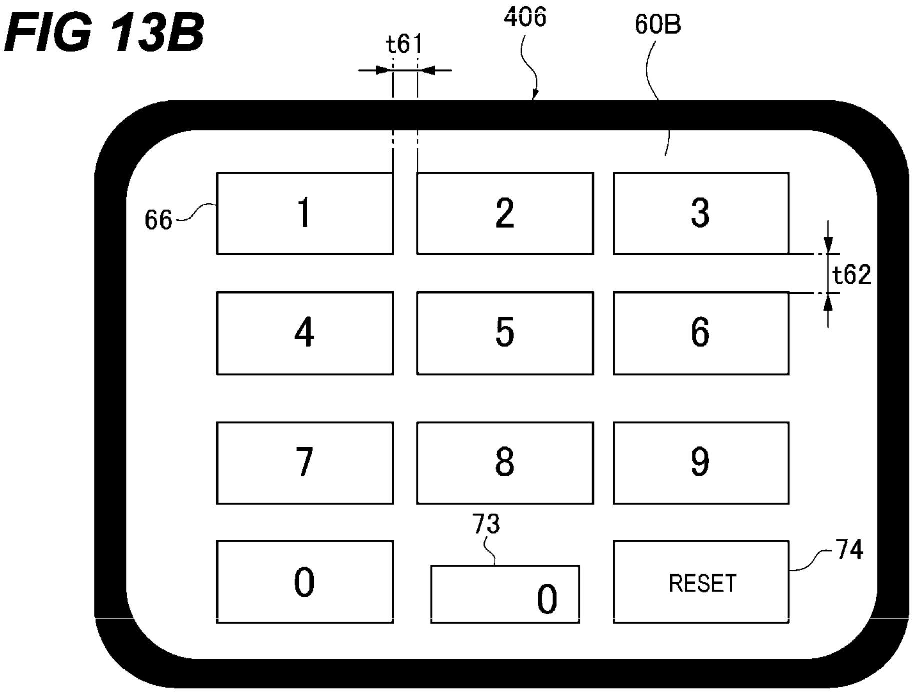

FIG. 12 illustrates the operation screen in the second operation mode, in making copy settings as one of functions of the image forming apparatus according to the second embodiment. The screen illustrated in FIG. 12 shows a setting display portion 61 that displays a state of the image forming apparatus main body and details of settings. The screen (the second image 60) illustrated in FIG. 12 also shows, as icons each indicating information on image formation, a "copy settings" button 71, a "numeric keypad display" button 72, a "reset" button 67 for resetting settings, and a "start" button 68 for starting a "copy" operation.

On the screen (the second image 60) illustrated in FIG. 12, the "copy settings" button 71 is a button indicating that several buttons 65 to 67 equal in function to the buttons 52 to 55 included in the first image 50 are integrated into one. On the screen (the second image 60) illustrated in FIG. 12, the "numeric keypad display" button 72 is a button indicating that a plurality of buttons 66 equal in function to the buttons 56 included in the first image 50 are integrated into one. That is, the screen (the second image 60) illustrated in FIG. 12 is a first divided image including the buttons 71 and 72 each indicating that several ones of the plurality of buttons 52 to 59 included in the first image 50 are integrated into one.

The screen (the second image 60A) illustrated in FIG. 13A shows a "finish" button 62, a "duplex copy" button 63, a "density" button 64, and an "other settings" button 65 that are respectively equal in function (information on image formation) to the buttons 52 to 55 included in the first image 50. That is, the screen (the second image 60A) illustrated in FIG. 13A is a second divided image including the buttons 62 to 65 integrated into the foregoing "copy settings" button 71.

On the other hand, the screen (the second image 60B) illustrated in FIG. 13B shows the plurality of buttons 66 that are equal in function (information on image formation) to the plurality of buttons 56 included in the first image 50. The plurality of buttons 66 are similar in function to a numeric keypad. The screen (the second image 60B) illustrated in FIG. 13B also shows, in addition to the plurality of buttons 66, a display portion 73 that displays an input number, and a "reset" button 74 for resetting an input numerical value. That is, the second image 60B illustrated in FIG. 13B is a second divided image that is different from the second divided image as the second image 60A and includes the plurality of buttons 66 integrated into the foregoing "numeric keypad display" button 72.

The CPU displays the second image 60 as the first divided image, the second image 60A as the second divided image, and the second image 60B as the second divided image on the LCD 406 one by one so as to switch among the second image 60, the second image 60A, and the second image 60B in the second operation mode.

Specifically, in the second operation mode, the first divided image (the second image 60) illustrated in FIG. 12 is displayed as the foregoing second image on the LCD 406 in place of the first image 50 in the first operation mode.

The buttons included in the second image 60 displayed as a single operation screen on the LCD 406 in the second operation mode are larger in size than the buttons included in the first image 50. In addition, the number of buttons included in the second image 60 displayed as a single operation screen on the LCD 406 in the second operation mode is smaller than the number of buttons included in the first image 50 displayed as a single operation screen on the LCD 406 in the first operation mode. According to this configuration, it is possible to reduce a possibility of erroneous operation in the second operation mode and to improve the operability of the operation portion 400.

The "copy settings" button 71 is pressed on the screen (the second image 60) illustrated in FIG. 12. As a result, the second divided image (the second image 60A) is displayed as the foregoing second image on the LCD 406, so that the screen changes to the screen illustrated in FIG. 13A. The user is thus able to, for example, choose finish, make duplex copy settings, and make density settings.

The buttons included in the second image 60A displayed as a single operation screen on the LCD 406 in the second operation mode are larger in size than the buttons included in the first image 50. In addition, the number of buttons included in the second image 60A displayed as a single operation screen on the LCD 406 in the second operation mode is smaller than the number of buttons included in the first image 50 displayed as a single operation screen on the LCD 406 in the first operation mode. In addition, clearances t41 and t42 each between two of the buttons included in the second image 60A displayed as a single operation screen on the LCD 406 in the second operation mode are respectively wider than clearances t31 and t32 each between two of the buttons included in the first image 50 displayed as a single operation screen on the LCD 406 in the first operation mode. According to this configuration, it is possible to reduce a possibility of erroneous operation in the second operation mode and to improve the operability of the operation portion 400.

The "numeric keypad display" button 72 is pressed on the screen (the second image 60) illustrated in FIG. 12. As a result, the second divided image (the second image 60B) is displayed as the foregoing second image on the LCD 406, so that the screen changes to the screen illustrated in FIG. 13B. The user is thus able to enter a numerical value.

The buttons included in the second image 60B displayed as a single operation screen on the LCD 406 in the second operation mode are larger in size than the buttons included in the first image 50. In addition, clearances t61 and t62 each between two of the buttons included in the second image 60B displayed as a single operation screen on the LCD 406 in the second operation mode are respectively wider than the clearances t31 and t32 each between two of the buttons included in the first image 50 displayed as a single operation screen on the LCD 406 in the first operation mode. According to this configuration, it is possible to reduce a possibility of erroneous operation in the second operation mode and to improve the operability of the operation portion 400.

As described above, also in the present embodiment, the CPU 101 displays as an operation screen each of the second images different from the first image on the LCD 406 in the second operation mode. It is thus possible to reduce a possibility of erroneous operation on the operation portion 400 in each mode and to improve the operability of the operation portion 400.

Third Embodiment

Figure 14:
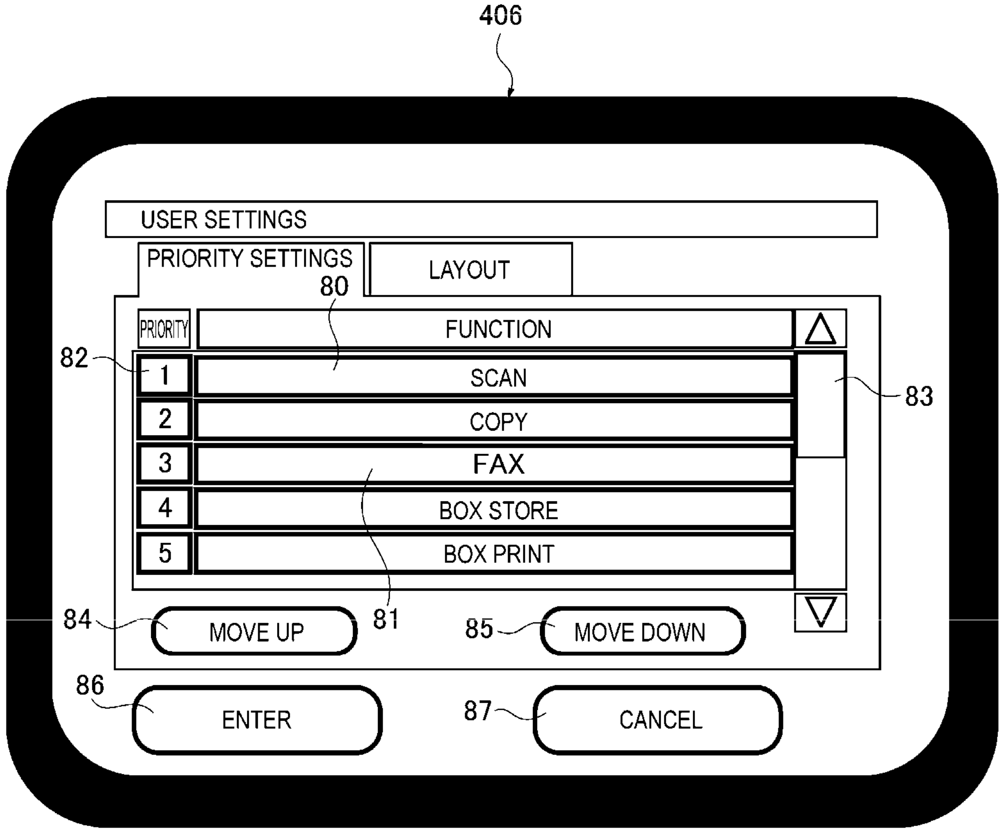
FIG. 14 is a diagram illustrating an example of a setting screen according to a third embodiment for setting priorities on buttons.
Figure 15:
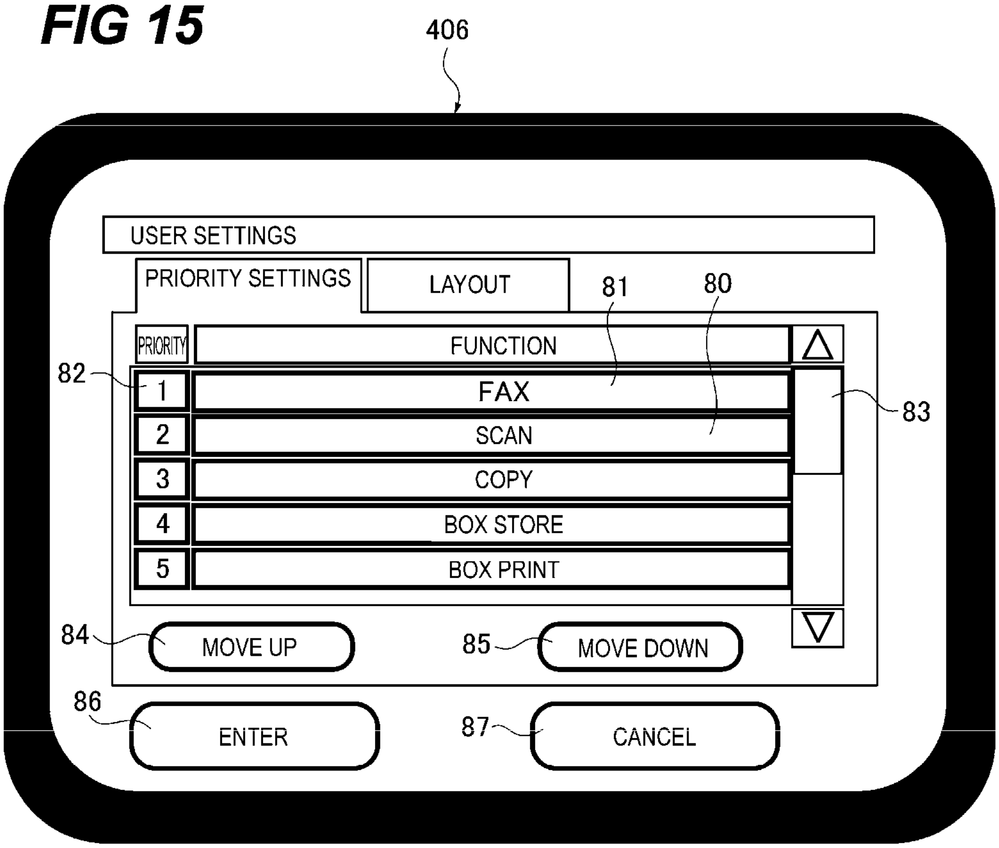
FIG. 15 is a diagram illustrating an example of the setting screen according to the third embodiment for setting the priorities on the buttons.
Figure 16:
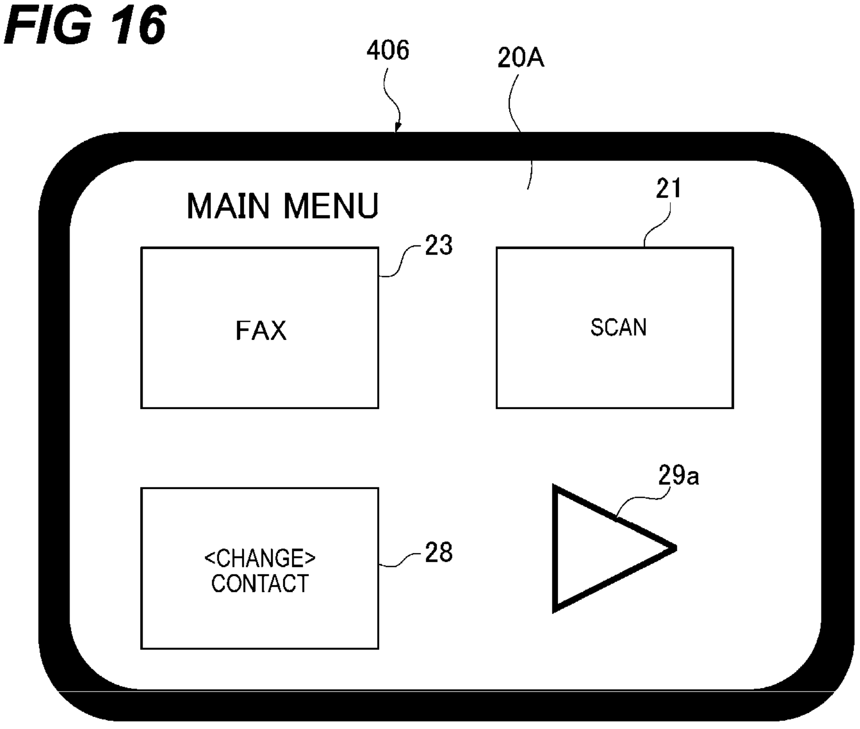
FIG. 16 is a diagram illustrating an example of a main menu screen in a second operation mode according to the third embodiment.

An image forming apparatus according to a third embodiment will be described with reference to FIGS. 14 to 16. FIGS. 14 and 15 are diagrams each illustrating an example of a setting screen according to the third embodiment for setting priorities on buttons by user settings. FIG. 16 is a diagram illustrating an example of a main menu screen in a second operation mode according to the third embodiment. The general configuration of the image forming apparatus is similar to that according to the first embodiment; therefore, the detailed description thereof will not be given herein.

With regard to a screen in the second operation mode, it is convenient for a user to display on an initial screen a button indicating a function to be frequently used by the user. Therefore, the screen can be optimized by the user. An embodiment of allowing the user to optimize a button arrangement is described with reference to FIGS. 14 to 16.

In the present embodiment, a CPU 101 displays on an LCD 406 a setting screen (FIG. 14 or 15) for setting priorities on the plurality of buttons included in the first image 10 (FIG. 8). The plurality of buttons included in the divided second images 20A and 20B (FIGS. 9A and 9B) are arranged in sequence according to the priorities on the buttons set on the setting screen (FIG. 16). A specific description will be given below.

The setting screens for user settings illustrated in FIGS. 14 and 15 each show priority numbers 82 each indicating a priority. The priority numbers 82 are associated with function names, such as “scan”, “copy”, and “fax”, indicating functions to which the priorities are assigned. The priorities illustrated in FIG. 14 are based on the priorities illustrated in FIGS. 9A and 9B in the first embodiment. For example, a priority 1 is assigned to a button 80 indicating a “scan” function, and a priority 3 is assigned to a button 81 indicating a “fax” function. The setting screen illustrated in FIG. 14 also shows a scroll bar 83 for scrolling up and down the buttons on the display surface of the LCD 406 in a case where the buttons indicating the functions do not fall within one page (the display surface of the LCD 406).

On the setting screen illustrated in FIG. 14, for example, in changing the priority on the “fax” function from the priority 3 to the priority 1, the user selects the button indicating the “fax” function, and then presses a “move up” button 84 twice. FIG. 15 illustrates a user setting screen after the foregoing operation. The priority 1 is assigned to the button 81 indicating the “fax” function. The priority on the button 80 indicating the “scan” function, to which the priority 1 has been assigned, is lowered to a priority 2. In addition, the priority on a button indicating a “copy” function, to which the priority 2 has been assigned, is lowered to the priority 3.

In lowering a priority, the user selects a button indicating a function on which the priority is lowered, and then presses a “move down” button 85. The user is thus able to lower the priority by the number of times the user presses the “move down” button 85.

If there is no problem about the settings on the setting screen illustrated in FIG. 15, the user presses an “enter” button 86 to place the settings. The setting screen then returns to the previous screen. In canceling the foregoing settings, the user presses a “cancel” button 87 to cancel the settings and maintain the preceding settings. The setting screen then returns to the previous screen.

When the setting screen illustrated in FIG. 15 returns to the previous screen, that is, the main menu screen, a second image 20A in which a button 23 that indicates the “fax” function and to which the priority 1 is assigned and a button 21 that indicates the “scan” function and to which the priority 2 is assigned are arranged is displayed as a leading screen in the second operation mode, on the display surface of the LCD 406 as illustrated in FIG. 16.

As described above, also in the present embodiment, the CPU 101 displays as an operation screen the second image different from the first image on the LCD 406 in the second operation mode. It is thus possible to reduce a possibility of erroneous operation on an operation portion 400 in each mode and to improve the operability of the operation portion 400.

Other Embodiments

The first embodiment has exemplified the configuration in which the CPU 101 displays as an operation screen each of the second images 20A and 20B different from the first image 10 on the LCD 406 in the second operation mode; however, the present invention is not limited thereto. For example, the CPU 101 that is in the second operation mode may change the region where the sensor detects the buttons (the icons) displayed on the LCD 406 in the first mode. Specifically, the region where the sensor detects the buttons (the icons) displayed on the LCD 406 in the second operation mode may be wider than that in the first mode. According to this configuration, it is also possible to reduce a possibility of erroneous operation in the second mode and to improve the operability of the operation portion 400.

The first embodiment has exemplified the configuration in which the image forming apparatus 1 is powered on in the first operation mode; however, the present invention is not limited thereto. For example, the image forming apparatus 1 may be powered on in the second operation mode. In this case, the second image 20A illustrated in FIG. 9A or the second image 20B illustrated in FIG. 9B is displayed on the display surface of the LCD 406. Alternatively, a selection screen for selecting either the first operation mode or the second operation mode may be displayed on the display surface of the LCD 406, and after the selection, the image in the selected operation mode may be displayed on the display surface of the LCD 406. This configuration also produces similar advantageous effects by applying the present invention.

The screens (the images) described in the foregoing embodiments are merely exemplary; therefore, the number of buttons, the arrangement of the buttons, the size of each button, and the kind of each displayed button are not limited to those described in the foregoing embodiments.

The second embodiment has exemplified the contact mode as the first mode and the contactless mode as the second mode. The second embodiment also has exemplified the configuration in which, in the contactless mode, the second image 60 illustrated in FIG. 12 different from the first image 50 illustrated in FIG. 11 is displayed as an operation screen on the display surface of the LCD 406. However, the present invention is not limited thereto. For example, the operation screen illustrated in FIG. 11 may be displayed in a standard mode (the first mode), the operation screen illustrated in FIG. 12 may be displayed in a simple mode (second mode), which is simpler in display format than the operation screen illustrated in FIG. 11, and image information may be input by a contact method of detecting a location where the instruction portion has touched, in each of the modes. Moreover, the screen in the standard mode and the screen in the simple mode may be switched at the time when the operation mode is switched. According to this configuration, it is also possible to reduce a possibility of erroneous operation in operating the operation portion by the contact method and to improve the operability of the operation portion.

Each of the foregoing embodiments has exemplified the configuration in which the touch panel control portion 404 is controlled by the controller 100 of the image forming apparatus 1; however, a controller and an arrangement are not limited thereto. For example, the touch panel control portion 404 may be controlled by the operation portion CPU 401.

Each of the foregoing embodiments has also exemplified the configuration in which making the size of each button (each icon) on the operation screen in the second mode larger than that on the operation screen in the first mode is combined with making the clearance between two of the buttons (the icons) on the operation screen in the second mode wider than that on the operation screen in the first mode; however, the present invention is not limited thereto. For example, either the size of each button (each icon) or the clearance between two of the buttons (the icons) on the operation screen in the second mode may be larger or wider than that on the operation screen in the first mode. According to this configuration, it is also possible to reduce a possibility of erroneous operation in the second operation mode and to improve the operability of the operation portion.

In each of the foregoing embodiments, the operation screen in the second operation mode is merely exemplary; therefore, the size of each button, the clearance between two of the buttons, and the kind of each displayed button, and the like are not limited to those displayed on the operation screen in the second operation mode.

For example, with regard to the buttons (the icons) included in the second image displayed as the operation screen on the LCD in the second mode, at least one of the buttons, such as a button with particularly high use frequency, may be larger in size than the buttons included in the first image. All the buttons (the icons) included in the second image displayed on the LCD in the second mode are not necessarily larger in size than the buttons included in the first image displayed on the LCD in the first mode. However, all the buttons (the icons) included in the second image displayed on the LCD in the second mode may be larger in size than the buttons included in the first image displayed on the LCD in the first mode. According to this configuration, it is also possible to reduce a possibility of erroneous operation in the second operation mode and to improve the operability of the operation portion.

The clearances each between two of the buttons (the icons) included in the second image displayed as the operation screen on the LCD in the second mode may be different from each other as long as these clearances are wider than the clearances each between two of the buttons included in the first image displayed on the LCD in the first mode. However, the clearances each between two of the buttons (the icons) in the second mode may be equal to each other as long as these clearances are wider than those in the first mode. According to this configuration, it is also possible to reduce a possibility of erroneous operation in the second operation mode and to improve the operability of the operation portion.

With regard to the clearances each between two of the icons included in the second image displayed as the operation screen on the LCD in the second mode, clearances between at least some of the icons, such as clearances between buttons with particularly high use frequency, may be wider than the clearances each between two of the icons included in the first image displayed as the operation screen on the LCD in the first mode. All the clearances each between two of the buttons (the icons) included in the second image displayed on the LCD in the second mode are not necessarily wider than the clearances each between two of the buttons included in the first image displayed on the LCD in the first mode. However, all the clearances each between two of the buttons (the icons) included in the second image displayed on the LCD in the second mode may be wider than the clearances each between two of the buttons included in the first image displayed on the LCD in the first mode. According to this configuration, it is also possible to reduce a possibility of erroneous operation in the second operation mode and to improve the operability of the operation portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-082113, filed May 18, 2023, which is hereby incorporated by reference herein in its entirety.

What is claimed is:

1. An image forming apparatus comprising:

an image forming portion configured to form an image on a recording medium;

and an operation portion including a display portion that displays as an operation screen an image including icons each indicating information on image formation, the operation portion being configured to input the information on image formation by a first mode in which the operation portion detects a position of an instruction portion being in contact with a surface of the display portion or a second mode in which the operation portion detects a position of the instruction portion at a position away from the surface by a predetermined distance in a direction perpendicular to the surface, wherein the operation portion that is in the first mode displays as the operation screen a first image including the icons on the display portion, the operation portion that is in the second mode displays as the operation screen a second image different from the first image on the display portion, and a clearance between two of icons included in the second image displayed as the operation screen on the display portion in the second mode is wider than a clearance between two of the icons included in the first image displayed as the operation screen on the display portion in the first mode.

2. The image forming apparatus according to claim 1, wherein at least one of the icons included in the second image displayed as the operation screen on the display portion in the second mode is larger in size than the icons included in the first image displayed as the operation screen on the display portion in the first mode.

3. The image forming apparatus according to claim 2, wherein the operation portion that is in the second mode divides the plurality of icons included in the first image displayed as a single operation screen on the display portion in the first mode between a plurality of divided second images, and displays the plurality of the divided second images on the display portion one by one so as to switch among the plurality of the divided second images.

4. The image forming apparatus according to claim 3, wherein each of the plurality of the divided second images includes a switch icon indicating a function of switching among the divided second images.

5. The image forming apparatus according to claim 1, wherein clearances each between two of the icons included in the second image displayed as the operation screen on the display portion in the second mode are different from each other.

6. The image forming apparatus according to claim 1, wherein the icons included in the second image displayed as a single operation screen on the display portion in the second mode are smaller in number than the icons included in the first image displayed as a single operation screen on the display portion in the first mode.

7. The image forming apparatus according to claim 1, wherein the operation portion that is in the second mode divides the plurality of icons included in the first image displayed as a single operation screen on the display portion in the first mode between a plurality of divided second images, and displays the plurality of the divided second images on the display portion one by one so as to switch among the plurality of the divided second images.

8. The image forming apparatus according to claim 7, wherein each of the plurality of the divided second images includes a switch icon indicating a function of switching among the divided second images.

9. The image forming apparatus according to claim 7, wherein the operation portion displays on the display portion a setting screen for setting priorities on the plurality of icons included in the first image, and arranges the plurality of icons included in each of the plurality of the divided second images, in sequence according to the priorities on the icons input through the operation portion.

10. The image forming apparatus according to claim 1, wherein the operation portion that is in the second mode divides the first image displayed as a single operation screen on the display portion in the first mode, into a first divided image including an icon indicating that several ones of the plurality of icons included in the first image are integrated into one and a second divided image including the integrated several icons, and displays the second image including the first divided image and the second image including the second divided image on the display portion one by one so as to switch between the second image including the first divided image and the second image including the second divided image.

11. The image forming apparatus according to claim 1, wherein the first image displayed as a single operation screen on the display portion in the first mode includes a first change icon indicating a function of changing to the second mode, and the second image displayed as a single operation screen on the display portion in the second mode includes a second change icon indicating a function of changing to the first mode.

* * * * *